(12) United States Patent
Gonguet

(10) Patent No.: US 10,785,123 B2
(45) Date of Patent: Sep. 22, 2020

(54) COMMUNICATION NETWORK OPTIMIZATION

(71) Applicant: Facebook, Inc., Menlo Park, CA (US)

(72) Inventor: Vincent Gonguet, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 78 days.

(21) Appl. No.: 16/195,526

(22) Filed: Nov. 19, 2018

(65) Prior Publication Data
US 2020/0162336 A1 May 21, 2020

(51) Int. Cl.
*G06F 11/34* (2006.01)
*H04L 12/24* (2006.01)
*H04L 12/26* (2006.01)

(52) U.S. Cl.
CPC .......... *H04L 41/14* (2013.01); *H04L 41/0823* (2013.01); *H04L 41/0883* (2013.01); *H04L 41/0893* (2013.01); *H04L 41/22* (2013.01); *H04L 43/045* (2013.01); *H04L 43/067* (2013.01)

(58) Field of Classification Search
CPC . H04L 41/14; H04L 41/0823; H04L 41/0883; H04L 41/0893; H04L 41/22; H04L 43/045; H04L 43/067
USPC ................................................ 709/223, 224
See application file for complete search history.

(56) References Cited

U.S. PATENT DOCUMENTS

| 6,061,722 A * | 5/2000 | Lipa ..................... G06F 11/3495 707/999.002 |
| 6,611,867 B1 * | 8/2003 | Bowman-Amuah ........................ H04L 41/046 709/218 |
| 6,971,063 B1 * | 11/2005 | Rappaport ............ H04L 41/145 709/203 |

(Continued)

FOREIGN PATENT DOCUMENTS

WO    WO 2016019122 A1    2/2016

OTHER PUBLICATIONS

International Search Report and Written Opinion for International Application No. PCT/US2018/067586, dated Aug. 12, 2019.

*Primary Examiner* — Thu Ha T Nguyen
(74) *Attorney, Agent, or Firm* — Baker Botts L.L.P.

(57) ABSTRACT

In one embodiment, the system determines network performance metrics in a number of geographic areas within a communication network based on application data of end users. The system receives, from a client system, a query for geographic areas of interest specifying network performance criteria based on network performance metrics and corresponding thresholds. The system identifies geographic areas of interest matching the network performance criteria of the query. The system determines, for each geographic area of interest, network performance features based on network performance metrics derived from application data collected from the geographic areas of interest. The system generates optimization recommendations for one or more of the geographic areas of interest. The optimization recommendations are customized for the geographic areas of interest based on the performance features associated with the respective geographic areas of interest. The system sends, to the client system, instructions for presenting the optimization recommendations.

20 Claims, 14 Drawing Sheets

(56) References Cited

U.S. PATENT DOCUMENTS

| | | | |
|---|---|---|---|
| 8,393,954 B2 * | 3/2013 | Lutnick | G07F 17/32 463/16 |
| 8,500,533 B2 * | 8/2013 | Lutnick | G07F 17/32 463/16 |
| 9,392,471 B1 * | 7/2016 | Thomas | H04W 24/02 |
| 10,063,431 B1 * | 8/2018 | Kollipara | H04W 24/10 |
| 10,425,832 B1 * | 9/2019 | Zawadzki | H04L 41/5038 |
| 2003/0225873 A1 * | 12/2003 | Wade | H04L 12/4633 709/223 |
| 2009/0122697 A1 | 5/2009 | Madhyasha | |
| 2009/0254971 A1 * | 10/2009 | Herz | G06Q 10/10 726/1 |
| 2012/0087269 A1 | 4/2012 | Hussein | |
| 2013/0329601 A1 * | 12/2013 | Yin | H04L 45/04 370/254 |
| 2015/0207720 A1 * | 7/2015 | Dagum | H04L 43/0829 370/252 |
| 2015/0334618 A1 | 11/2015 | Gillett | |
| 2016/0112822 A1 * | 4/2016 | Giral | H04W 24/02 455/414.1 |
| 2016/0112894 A1 * | 4/2016 | Lau | H04W 24/10 370/252 |
| 2016/0344604 A1 * | 11/2016 | Raleigh | G06F 9/54 |
| 2017/0353991 A1 * | 12/2017 | Tapia | H04L 41/0631 |
| 2018/0206135 A1 * | 7/2018 | Chow | H04L 43/50 |
| 2019/0087840 A1 * | 3/2019 | Zachariah | G06F 16/248 |
| 2019/0199589 A1 * | 6/2019 | Le | G06N 20/00 |
| 2019/0356533 A1 * | 11/2019 | Vasseur | H04L 41/14 |
| 2020/0022006 A1 * | 1/2020 | Froehlich | H04L 41/0631 |
| 2020/0028746 A1 * | 1/2020 | Zawadzki | H04L 41/5067 |
| 2020/0029240 A1 * | 1/2020 | Li | H04L 43/08 |
| 2020/0039665 A1 * | 2/2020 | Vaujour | B64G 1/242 |
| 2020/0092159 A1 * | 3/2020 | Thampy | H04B 17/23 |
| 2020/0145816 A1 * | 5/2020 | Morin | H04L 41/16 |

* cited by examiner

COMMUNICATION NETWORK OPTIMIZATION

TECHNICAL FIELD

This disclosure generally relates to communication network, and in particular, to optimizing communication networks performance.

BACKGROUND

Communication networks, such as fiber-optic networks, cellular networks, and broadband wireless networks, provide data communication channels for computing systems (e.g., a computer, a tablet, a smartphone) to communicate data and information, such as, text, images, videos, website content, etc. A geographic area covered by a communication network may be divided into a number of sub-areas (e.g., tiles, cells in cellular networks, regions such as a county, an area of a collection of cities, towns, village, etc.). Each sub-area may generate certain amount of network traffic and the communication network may provide connection services to any number sub-areas covered by the communication network. Users may access the communication network (e.g., using a computing device) for downloading and uploading data. The communication network may have a bandwidth to allow the users to use services supported by the communication network.

SUMMARY OF PARTICULAR EMBODIMENTS

Particular embodiments described here relate to a method of generating network optimization recommendation for optimizing network capacity and connectivity demand based on application data (e.g., applications running on client devices). The system may collect application data in one or more areas (e.g., cells, tiles, regions) covered by the communication network and determine one or more network performance metrics (e.g., network speeds, network latency, number of requests) related to the network capacity and connectivity demand in those areas. Then, the system may identify one or more areas based on the network performance metrics associated with these areas and one or more criteria (e.g., thresholds corresponding to network performance metrics). For example, the system may identify areas having high network capacity (e.g., high network coverage, high throughput) and low connectivity demand (e.g., less customers, less data usage). As another example, the system may identify areas having low network capacity and high connectivity demand. As another example, the system may identify areas having high network capacity and high connectivity demand. Then, the system may determine one or more network performance features associated with the identified areas and may generate one or more optimization recommendations for the identified areas based on the network performance features and network performance metrics associated with these areas. The system may optimize the network capacity and connectivity demand in these areas to improve the network performance (e.g., revenues, connected people, network speeds, user experience). The system may integrate a number of sub-systems including, for example, a network congestion detection system, a network insights system, an Ads system, and a pricing system, to generate the optimization recommendations for the identified areas.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Overview

Problems

Figure 1:
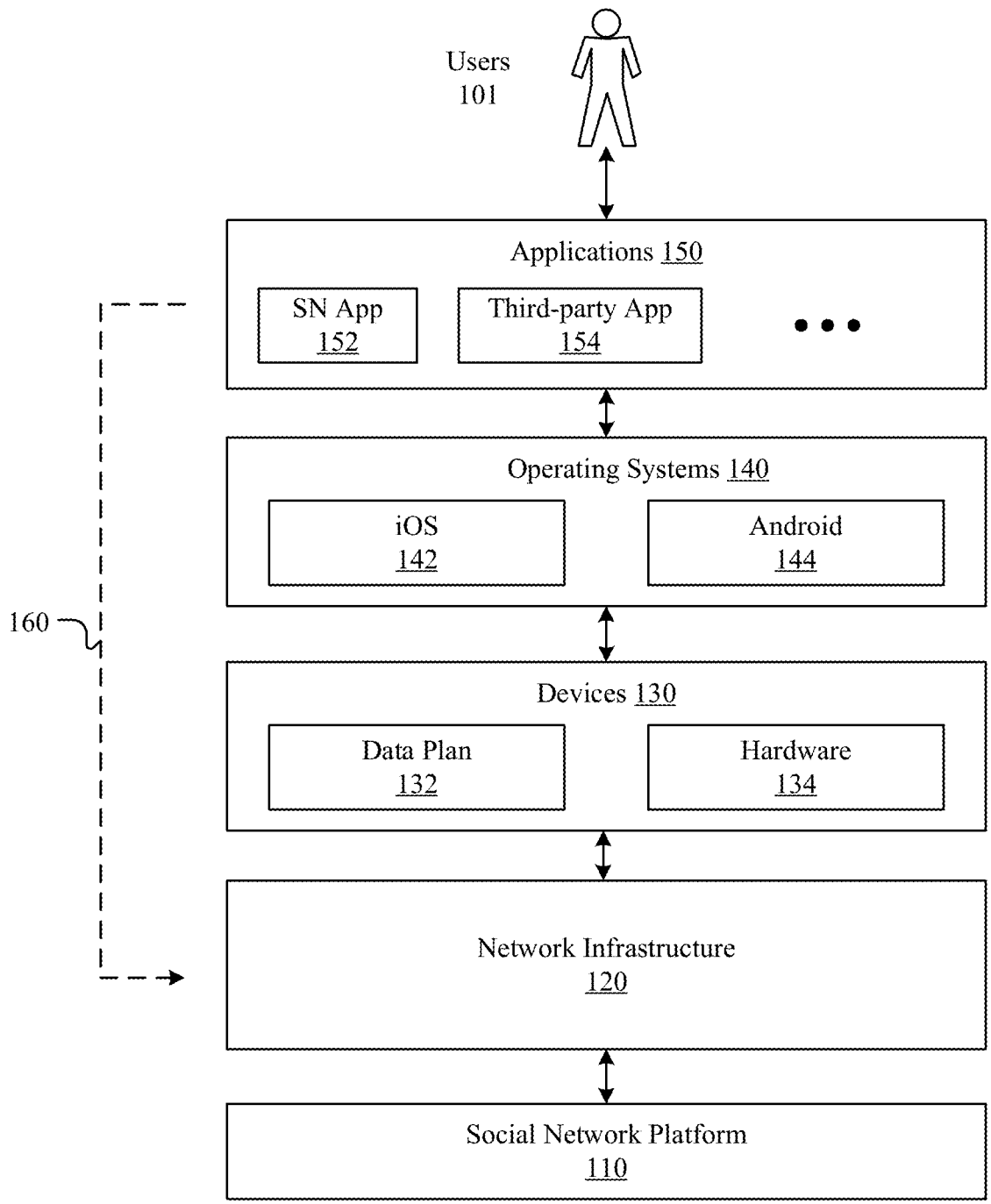
FIG. 1 illustrates an example system for optimizing communication networks.

Communication networks may have unbalanced network capacity (e.g., the amount and quality of throughput) and connectivity demand (e.g., the amount content being requested by users, the number of requesting users) in one or more areas that are covered by the networks. This unbalance problem of the network capacity-demand may cause a number of other technical problems for the networks. For example, if a network has high connectivity demand and low network capacity in an area, the network in that area may have low network performance (e.g., low network speed, high network latency) which eventually leads to low quality of experience (QoE) for users (e.g., network congestions, jitters). As another example, if a network has low connectivity demand and high network capacity in an area, the network in that area may have a large percentage of infrastructure resources (e.g., cell towers, switches) that are running under suboptimal states with much wasted capacity and bandwidth.

Traditional methods for optimizing communication network performance (e.g., network capacity-demand balance) have many limitations. For example, traditional network optimization methods cannot accurately decide which areas should be optimized. An inaccurate determination on optimized areas may mistakenly improve network capacity in the areas that already have over-capacity at the detriment of areas which actually need to be improved. As another example, traditional network optimizations for increasing connectivity demands may take a long time (e.g., weeks, months) to have some impacts on the network connectivity demands. And the optimization impacts cannot be precisely predicted beforehand nor be accurately measured afterward, which inevitably result in suboptimal network optimization results. As another example, traditional network optimizations lack of timely response to the dynamic change of the network demand-capacity, which may be constantly changing from time to time. An optimization action that works during a first time period may not be effective during a second time period because of dynamic changes of the network demand-capacity. Traditional one-fit-all network optimizations would inevitably result in suboptimal network performance. As another example, traditional network optimizations lack competitive view for taking no consideration of competitors' networks status because of the absent of the operation data from the competitor networks. Furthermore, traditional network optimizations only rely on infrastructure level data and are not directly related to the improvement of QoE of end users.

Solutions

Particular embodiments of the system may generate optimization recommendations and optimize communication networks for balancing network capacity and connectivity demand based on application data of end users. Particular embodiments of the system may accurately determine the areas (e.g., at granular level) that need to be optimized and generate customized optimization recommendations for these areas based on network performance features of these areas. Particular embodiments of the system may precisely predict the optimization impacts before the optimization or/and measure the actual optimization impacts after the optimization. Particular embodiments of the system may collect data (e.g., application data, network performance data) from networks of multiple carriers and provide competitive perspective for optimizing the communication networks.

Benefits

Particular embodiments of the system address the limitations and shortcomings of existing network optimization technologies and provide improved technical solutions for optimizing the network performance. Particular embodiments of the system allow communication networks to balance network capacity and connectivity demand, and therefore have better network performance (e.g., increased network speed, reduced network latency) and better quality of experience (QoE) for end users. Particular embodiments of the system improve the efficiency of the communication networks by eliminating or reducing the wasted capacity and bandwidth of the network. Particular embodiments of the system may provide faster and more effective network optimization by precisely identifying the areas that need to be optimized (e.g., at large scale or/and granular level) and by customizing the recommended optimization actions based on the network performance features of the identified areas. Particular embodiments of the system may precisely predict the impact of the optimizations beforehand and measure the actual impact afterward, and therefore enable more effective optimizations for the networks. Particular embodiments of the system may optimize the networks dynamically based on real-time or near-real-time data that are collected from applications of end users and provide customized optimization for different time periods based on the network performance features during respective time periods. Particular embodiments of the system may provide competitive perspectives for optimizing network in particular areas based on the application data collected cross the networks of multiple carriers.

Network Optimization System

FIG. 1 illustrates an example system 100 for optimizing communication networks. In particular embodiments, the system 100 may include a number of layers including, for example, a social network platform 110 (e.g., servers, databases), network infrastructure 120 (e.g., fiber networks, cellular towers, cable networks, switches), computing devices 130 (e.g., client devices, computers, smartphones, tablets), operating systems 140 (e.g., iOS 142, android 144), applications 150 (e.g., social network applications 152, third-party applications 154, operators' applications, carriers' applications, or any application running on user devices), users 101, etc. The social network platform 110 may provide content and services to users 101 through the network infrastructure 120 and the computing devices 130. The computing devices 130 may include device hardware 134 (e.g., client devices, computers, smartphones, tablets) and may be associated with particular data plans 132 provided by one or more carriers. The computing devices 140 may include an operating system (e.g., iOS 142, android 144) and a number of applications 150 (e.g., social network applications 152, third-party applications 154, operators' applications, carriers' applications, or any other applications) running on the computing devices 130. The users 101 may interact with the applications 150 running on the computing devices 130 to access the content and services provided by the social network platform 110. In particular embodiments, the system 100 may collect data (e.g., application names, application types, time duration, quality of experience, network speed, latency, total amount of data delivered, signal strength, number of connected towers, signal stability status, network coverage, etc.) from the applications 150 running on the computing devices 130 used by the users 101. The system 100 may collect the application data through one or more application programming interfaces (APIs) provided by the social network platform 110 or third-parity entities (e.g., network carriers, operating system providers, application developers, application service providers). The system 100 may use the collected application data for monitoring the network performance, such as, detecting network congestion or coverage problems. The system 100 may provide network status 160 (e.g., congested areas, coverage alerts, network speeds, network latency, network performance metrics, etc.) based on the collected application data for the optimization of the network (e.g., network infrastructure 120). The system 100 may also provide feedback information (e.g., improvements on QoE, network speed, latency) for the optimization actions taken on the communication network.

In particular embodiments, the system 100 may monitor the communication network performance (e.g., network traffic congestions, network coverage issues) based on the data from both front-end (e.g., user devices 130, applications 150, operating system 140, websites, search engines, etc.) and back-end (e.g., social network platform 110, network infrastructure 120, servers, switches, database, etc.) of the communication network. In particular embodiments, the system 100 may collect user experience data (e.g., network speeds, network latency, signal stability status) from both front-end and back-end of the communication network. In particular embodiments, the system 100 may use the data collected from the front-end (e.g., applications) to generate optimization recommendations for the back-end network infrastructures 120 or/and social network platform 110. In particular embodiments, the system 100 may use the data collected from the back-end (e.g., social network platform 110, network infrastructure 120) to generate optimization recommendations for the front-end user experience (e.g., applications 150, operating system 140, user devices 130, data plan 132, network speeds, latency, etc.). In particular embodiments, the system 100 may determine one or more network performance metrics (e.g., ratios based on average network speeds) and compare the network performance metrics to respective threshold values to detect network congestions in one or more geographic areas covered by the communication network. In particular embodiments, the system 100 may determine one or more network coverage metrics (e.g., signal strength, number of connected towers, signal stability status) and compare the network coverage metrics to respective threshold values to detect the network coverage issues. In particular embodiments, the system 100 may determine one or more network performance features based on the network performance metrics associated with one or more areas and during one or more time periods. In particular embodiments, the system 100 may generate one or more customized network optimization recommendations based on the network performance features associated with the areas (or/and time period) where the network will be optimized.

System Framework

Pipeline Overview

Figure 2:
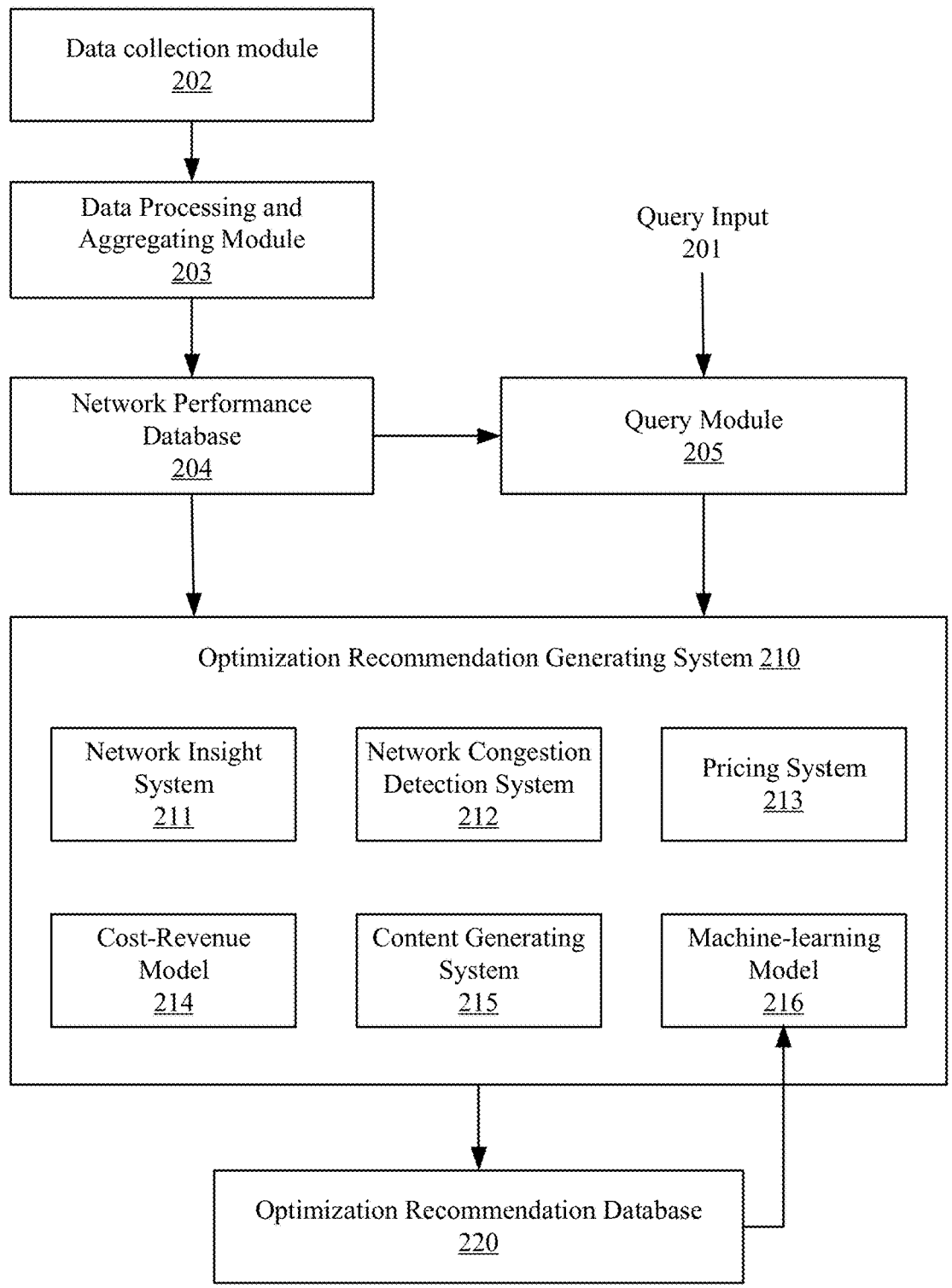
FIG. 2 illustrates an example framework for generating network optimization recommendations.

FIG. 2 illustrates an example network optimization system framework 200. In particular embodiments, the network optimization system framework 200 may include a data collection module 202, a data processing and aggregating module 203, a network performance database 204, a query module 205, an optimization recommendation generating system 210, an optimization recommendation database 220, etc. In particular embodiments, the optimization recommendation generating system 210 may include (or integrate) a number of sub-systems including, for example, a network insights system 211, a network congestion detection system 212, a pricing system 213, a cost-revenue model 214, a content generating system 215, a machine learning model 216, etc. In particular embodiments, the network optimization system may use the data collection module 202 to collect data from applications running on user devices connected by communication networks. In particular embodiments, the system may collect network performance data directly from the network infrastructure (e.g., cell towers, network fibers, switches, servers). The system may use the data processing and aggregating module 203 to process (e.g., cleaning, filtering) and aggregate the collected data. The processed and aggregated data may be stored in the network performance database 204. In particular embodiments, the system may determine a number of network performance metrics or parameters based on the processed and aggregated data and store these metrics and parameters in the network performance database 204. In particular embodiments, the network performance data 204 may store raw application data, raw network infrastructure data, processed and aggregated application data, processed and aggregated infrastructure data, network performance metrics or parameters, or any related data (e.g., associated cell ID).

In particular embodiments, the system may use the query module 205 to receive one or more query inputs 201 from users (e.g., mobile network operators (MNOS)) of the network optimization system. In particular embodiments, the query inputs 201 may be received from MNOs through a network insights interface on a client system. For example, the client system may include a computing system running remotely to the computing system hosting the network optimization system. The network insights interface on the client system may include a computer application, a mobile application, a web interface through browser, etc. The query inputs 201 may be sent to the network optimization system (e.g., query module 205) through network connection. The query module 205 may access the network performance database 204 to identify the areas that meet the query criteria of the users. The list of the identified areas may be sent to the optimization recommendation generating system 210 for generating optimization recommendations. After the optimization recommendations are generated, the optimization recommendations may be sent back to the network insights interface with related display instructions to be displayed on the network insight interface on the client system. In particular embodiments, the query input 201 may be received through a network insights interface locally associated to the network optimization system and the optimization recommendations may be displayed on the local network insights interface.

In particular embodiments, the system may use the network insights system 211 to determine one or more network performance features for each of the areas of interest identified in the querying process. The network insights system 211 may access the network performance database 204 and determine the network performance features based on the data (e.g., application data, infrastructure data, network metrics) stored in the network performance database 204. In particular embodiments, the system may use the network congestion detection system 212 to detect network congestions in one or more areas of the identified areas and generate congestion alerts correspondingly. U.S. patent application Ser. No. 16/155,510, entitled "Detecting Communication Network Insights of Alerts," filed on 9 Oct. 2018, which is incorporated by reference as an example only and not by way of limitation, discloses examples of detecting network congestion and generate network congestion alerts.

In particular embodiments, the system may use the pricing system 213 and the cost-revenue model 214 to determine a number of cost-revenue related parameters associated with one or more recommended optimization actions. In particular embodiments, the system may use the content generating system 215 to generate a series of digital content (e.g., Ads campaign) customized for different areas based on the network performance features associated with those areas and the cost-revenue related parameters of the recommended optimization actions. In particular embodiments, the system may use the machine learning (ML) model 216 to determine the network performance features (e.g., which recommendations are effective for which areas) and predict the effectiveness of optimization recommendation. The ML model may be trained based on the historical data stored in the optimization recommendation database 220 or pre-labeled data that is generated for training the ML model. In particular embodiments, the system may generate one or more network optimization recommendations for optimizing the network performance in the identified areas. The optimization recommendations and related data (e.g., optimization action impact, predicted effectiveness) may be stored in the optimization recommendation database 220.

In particular embodiments, the system may provide an end-to-end solution for MNOs to have network insights and generate network optimization recommendations from a few queries. The operators may input queries corresponding to regions of interest and the system may automatically identify those areas meeting the operators' queries, and then automatically generate optimization recommendations (e.g., Ads campaigns, pricing strategies, network upgrading, network traffic loading, etc.) for those areas. The congestion detection system may generate congestion alerts for the areas having network congestion. The action systems (e.g., pricing system, content generating systems) may provide further provide correcting improvements to the network and solve different network problems in different ways. Therefore, the system can greatly accelerate the process of network optimization. The system may optimize any type of network including, for example, cellular networks, fiber networks, cable networks, public Wi-Fi networks, etc.

Cost-Revenue Model

In particular embodiments, the system may use a cost-revenue model to determine recommended optimization actions for optimizing the network capacity and connectivity demand. The system may use the cost-revenue model to determine cost-revenue related parameters or performance features associated with one or more recommended optimization actions. For example, the cost-revenue model may be used to determine, for example, but not limited to, cost of building networks, cost for upgrading networks, cost for increasing network speeds, cost for adding cell towers, cost for obtaining new customers, cost for acquiring customers from competitors, cost of segmented service plans, cost for reaching the customers, cost for network operations, cost for retail operations, revenue from data usage of consumers (e.g., revenue per user, revenue per user per year, total network revenue in particular areas), etc. The system may determine the recommended optimization actions based on a number of cost-revenue related parameters and performance features associated with the recommended optimization actions. For example, the system may generate recommendations including recommended optimization actions with the lowest cost for building or upgrading the network and improving the network performance (e.g., increasing the amount of network throughput to improve the quality of experience of the users). As another example, the system may generate recommendations including recommended optimization actions that reduce the costs to consumers and make the network connectivity more affordable to consumers and increase the total revenue of the network. As another example, the system may generate recommendations including recommended optimization actions to increase the consumer awareness of the network and the willingness to connect or/and to acquire the customers with reasonable cost.

Large Scale and Granular Level Optimization

In particular embodiments, the system may solve the network capacity and connectivity demand balance problem at a large scale (e.g., cities, counties, states, countries) or/and at a small granular scale (e.g., cells, tiles, zip code areas) to accelerate the path to connect more people and to provide better quality of experience. In particular embodiments, the system may generate network optimization recommendations on granular level for the area of interest. When the system optimizes network performance at a large scale (e.g., a city, a county, a state, a country), the system may divide large area of interest into a number of smaller sub-regions (e.g., cells, tiles, zip code regions) and model each sub-region using a tile in a particular shape (e.g., square, polygon). The network optimization at large scales could be based on the network insights (e.g., network performance features, network performance metrics) of the sub-regions at granular levels (e.g., cells, tiles, zip code regions). In particular embodiments, the system may directly optimize network performance at a granular level (e.g., a cell, a tile, a zip code region). In particular embodiments, the system may optimize the network performance in a large region using different recommended optimization actions in different sub-regions. The recommended optimization actions for each sub-region may be customized for that sub-region based on the network insights (e.g., network performance features, network performance metrics) of that sub-region. In particular embodiments, the system may provide more precise and effective optimization of the network performance for an area of interest by using more precise data collected at granular levels. In particular embodiments, the system may provide more flexibility allowing MNOs to optimize the network at different scales.

Measure Effectiveness

In particular embodiments, the system may monitor the network performance and quantitatively and accurately measure the impact of the recommended optimization actions. For example, the system may measure the optimization outcome in targeted areas and monitor how network performance metrics changes in those areas. In particular embodiments, the system may map out situations such as how many regions and which regions have network performance improved, how much is the improvement (e.g., change in one or more network performance metrics) and what are corresponding recommended optimization actions applied on those regions. The system may measure the trend of how network performance gets better or gets worse and determine which optimization actions have greater impact or/and which optimization actions are more efficient. For example, the system may determine that load shifting from day-time to night-time works well in some areas but does not work in some other areas. The system may use this knowledge related to localized areas and specific optimization actions to improve the optimization recommendation for future network optimization. The system may use a machine-learning model trained by the historical data to improve future optimization recommendations based on the learned knowledge.

Predict Impact

In particular embodiments, the system may predict the effect and impact of recommended network recommended optimization actions on the targeted areas to be optimized. The system may predict the values or the changes of one or more network performance metrics as a result of executing the recommended optimization actions. For example, the system may predict how many new customers will be acquired by a customer acquisition campaign. As another example, the system may predict how many customers may be converted from competitor by a low-price data plan package. As another example, the system may predict the decreasing amount of revenue per user by reducing cost to customers and the increasing amount of total revenue from newly acquired customers. As another example, the system may predict the total number of connected people and the cost per connected user. As another example, the system may predict the effectiveness of one or more recommended optimization actions with specific budget limitations to particular areas. As another example, the system may predict the user behaviors (e.g., likelihood to switch networks) based on some signals in an acquisition model (e.g., switch SIM card as signals for switching carriers) and identify which customers are likely to be acquired. Based on that result, the system may filter out specific regions including those customers and recommend corresponding optimization actions (e.g., ads campaigns) for these regions. In particular embodiments, the system may make these predictions using a machine-learning (ML) model trained by historical data or/and pre-labeled data. For example, the ML model may be trained based on the former optimization recommendations generated by the system and stored in the optimization recommendation database. As another example, the ML model may be trained based on the pre-labeled data which may be labeled by in-field engineering monitoring the network performance. In particular embodiments, the system provides unique network insights for MNOs to evaluate the effectiveness of potential optimization actions.

Data Collection

Location/Time Based App Data Collection

In particular embodiments, the system may collect raw application data (e.g., via APIs) in a number of geographic areas (e.g., cells, tiles, regions) covered by a communication network. The data collected by the system may include information about, for example, how people are using the applications, how much time they spend using the applications, what are application names and types, how often the users come back to the applications, what is quality of experience (e.g., network speed, latency, network coverage), etc. In particular embodiments, the data collected by the system may include location-based network performance data related to the network performance in particular areas of interest. In particular embodiments, the data collected by the system may include time-based network performance data related to the network performance during particular time periods of interest. The network performance data may be related to network performance at the application level (e.g. traffic volume, demand volume, network speeds, network capacity, bandwidth) and the quality of experience (QoE) as experienced by the end users of the network. The raw application data may be logged based on requests from applications together with the time stamp associated which each application request. The collected data may include the cell identifications of serving cells that the user devices are connected, location information of user devices (e.g., via APIs when user approves and enables location-based services of the devices), carrier information (e.g., network providers), etc. The cell identification of each cell may be unique by containing concatenated information such as air interface technology type information. The collected data may include the counters related to the total bits of information delivered and the time spent for delivery of that information, which may be used to determine the download speed of the network. In particular embodiments, the system may collect application data in real-time, near-real-time, or periodically based on pre-determined time intervals (e.g., seconds, minutes, hours, days, weeks, months). In particular embodiments, the applications that are used for collecting data may include, for example, but are not limited to, social network applications, third-party applications, smartphone applications, computer applications, network carrier applications, service provider applications, operating system associated applications, or any suitable applications running on a client system. In particular embodiments, the system may collect infrastructure data from network infrastructures including, for example, but not limited to, servers, network switches, cell towers, fiber network links, wireless hot spots, or any suitable systems associated with the network infrastructure.

Multiple Communication Networks

In particular embodiments, the system may collect application data from a number of user devices that are connected by these different communication networks (e.g., different carriers or service providers) to collect network performance data of multiple communication networks (e.g., different carriers or service providers). The network performance data across multiple communication networks may be used to generate network optimization recommendations and optimize a communication network with competitive perspective (e.g., based on competitor's network performance data, executed or completed optimization actions). The user devices connected by the same or different communication networks may send communication requests to and receive data (e.g., social network data) from the social network platform back and forth. In particular embodiments, the system may sample the communication requests with a particular sampling rate (e.g., one in one hundred). The system may record information about the number of devices that are connected, the number of requests from user devices, the time required for the requests to be received by the social network platform, the amount of data transmitted by the social network platform to the user devices, the time spent in transmitting that data to the user devices, etc. The system may store the collected information in one or more database on which the system may run an information processing pipeline for optimizing the communication networks.

Filtering and Aggregating

In particular embodiments, the system may preprocess the collected raw data for data cleaning and data aggregating. The system may first filter and clean the collected data and then, may aggregate the data at different levels. For example, the system may aggregate the data by cells, tiles (e.g., squares describing geographic areas with different resolutions), or regions (e.g., zip-code regions, counties, provinces, states). After the data aggregation, the system may visualize the data set and use the aggregated data as inputs for network modelling. In particular embodiments, the system may store the aggregated data in different databases. For example, the system may store the data aggregated by cells in the cell database. As another example, the system may store the data associated to or/and aggregated by tiles or locations in the tile database. The information associated with tiles may include, for example, identifications of cells related to the tiles, identifications of the tiles, tile sizes, identifications of carriers, metadata, network performance data, etc. As another example, the system may store the data associated to or/and aggregated by regions in the regional database. The data associated to the regions may include polygons representing regions, polygon identifications, collections of polygons, customized shapes representing regions, etc. A polygon in the regional database may represent a region of any size, for example, a zip-code area, a settlement, a county, a town, a city, a state, a country, etc. The system may access to all databases in including the cell database, the tile database, or/and the regional database for determining network performance metrics and identifying the areas of interested based on the network performance metrics. In particular embodiments, the system may aggregate the collected data periodically (e.g., every week or every several weeks). In particular embodiments, the system may collect, preprocess, and aggregate data in real-time, near-real-time, or periodically at pre-determined time intervals.

Network Metrics

In particular embodiments, the system may determine a number of network performance metrics or parameters based on the collected application data. The system may calculate the values of the network performance metrics and store the calculated values in the network performance database. For example, the counters of the total bits of the information delivered and the corresponding time spent for delivery of that information may be used to determine the download speed of the network. As another example, the system may determine, based on the collected data, a speed of connection (e.g., dividing the total bits processed by the time spent), cell identifications (e.g., cells to which devices are connected to), information of carriers, time, locations, types of devices, application versions, etc. The data may be continuously collected at the applications and may be periodically (e.g., daily or every several days) sent back to the social network platform for storage. The network performance metrics or parameters may include, but are not limited to, a network capacity metric, a network demand metric, a network speed, a network latency, a congestion metric, a congestion alert, a peak traffic amount, peak traffic hours, busy hours, non-busy hours, a network coverage metric, a network throughput, a network throughput quality metric, a change of a network throughput, a population density, a network engagement time, a type of engagement network content, a market share, a churn rate, a connected population, a population that has an affordability metric above a threshold, a network capacity utilization efficiency, an overall revenue, a change in the overall revenue, a number of current customers, a data usage metric, a number of new customers, a predicted number of new customers, a number of customers switched from competitor, a predicted number of customers switched from competitor, an acquisition rate, a predicted acquisition rate, an acquisition cost per customer, a predicted acquisition cost per customer, a network revenue increase, a predicted network revenue increase, a completed optimization action, an impact metric of an optimization action in an area, a predicted impact metric of an optimization action, a network performance metric of a competitor network, an optimization action taken by a competitor network, a network type, a network technology status, an area type, a geographic type, an area size, a budget for improving network, a data plan price, a pricing strategy, a cost to reach consumers, a cost for an optimization action, a cost for network operations, a cost for retail operations, etc.

In particular embodiments, the network capacity metric may be determined based on the network coverage metric and the network throughput (e.g., network coverage× throughput). In particular embodiments, the network demand metric may be determined based on the customer number and the data usage metric (e.g., customer number× data usage). In particular embodiments, the system may identify different categories of areas of interest (e.g., high-capacity and low demand area, low-capacity and high demand area, high-capacity and high-demand areas) by comparing the network capacity metric and the network demand metric to corresponding thresholds (e.g., from query input by mobile network operators or determined by the network optimization system using ML model).

Smart Query

In particular embodiments, the network optimization system may allow users (e.g., mobile network operators) of the network optimization system to perform a condition-based query to identify one or more areas of interest (e.g., cells, tiles, regions) covered by a communication network. The system may receive a query from the mobile network operations (MNOs). The query may include one or more network performance criteria or conditions for identifying the areas of interest within the communication network. For example, the system may receive from MNOs a query of "low speed, high demand, and low market share." In particular embodiments, the network performance criteria may include one or more thresholds for one or more of the network performance metrics. The system may determine the values of the corresponding performance metrics (e.g., network speed, demand, market share) in the monitored areas of the network based on the collected application data. Then, the system may compare the network performance metrics to the corresponding thresholds to identify the areas of interest which meet the network performance criteria of the query. In particular embodiments, the system may receive the threshold values (e.g., market share lower than 10%) from the users of the network optimization system. In particular embodiments, the system may use machine-learning (ML) models to determine the threshold(s) for each related network performance metric (e.g., network speed, connectivity demand, market share) in the query. The MNOs may only need to input descriptive query (e.g., low speed, high demand, low market share) without specifying the values of the thresholds and the system may automatically identify the corresponding areas of interest based on threshold values determined using ML models.

In particular embodiments, the system may compare each performance metric associated with the query to a corresponding threshold value to determine whether the associated area meets the criterion of the current query for this particular performance metric. For example, the system may determine that network speeds (e.g., 7.5 Mbps) in a number of areas are lower than the network speed threshold (e.g., 10 Mbps) and may identify these areas as low speed areas. As another example, the system may determine that the network connectivity demand (e.g., 1000 samples of requests) of a number of areas exceeds the connectivity demand threshold (e.g., 500 samples of requests) and may identify these areas as high demand areas. As another example, the system may determine that the market share (e.g., 15%) in a number of areas is lower than the market share threshold (e.g., 20%) and may identified these areas as low market share areas. The system may generate network insights (e.g., network performance features) for the operators based on the query results to precisely identify the areas that are interest to the operators.

In particular embodiments, the system may allow MNOs to query the system based on a combination of network performance metrics or parameters, for example, network speeds, network latency, connectivity demands, signal strengths, network coverage, market shares, network types (e.g., fiber networks, wireless towers), population, population density, area types (e.g., city, rural), localized customer profiles (e.g., in each cell, tile, or polygon), upgrading activities, competitor information, volume of samples, etc. The system may provide the flexibility for the operators to query at different area levels (e.g., polygons, tiles, cells, zip code area) and use different combinations of criteria (e.g., low speed, high demand, low market share, etc.).

Figure 3A:
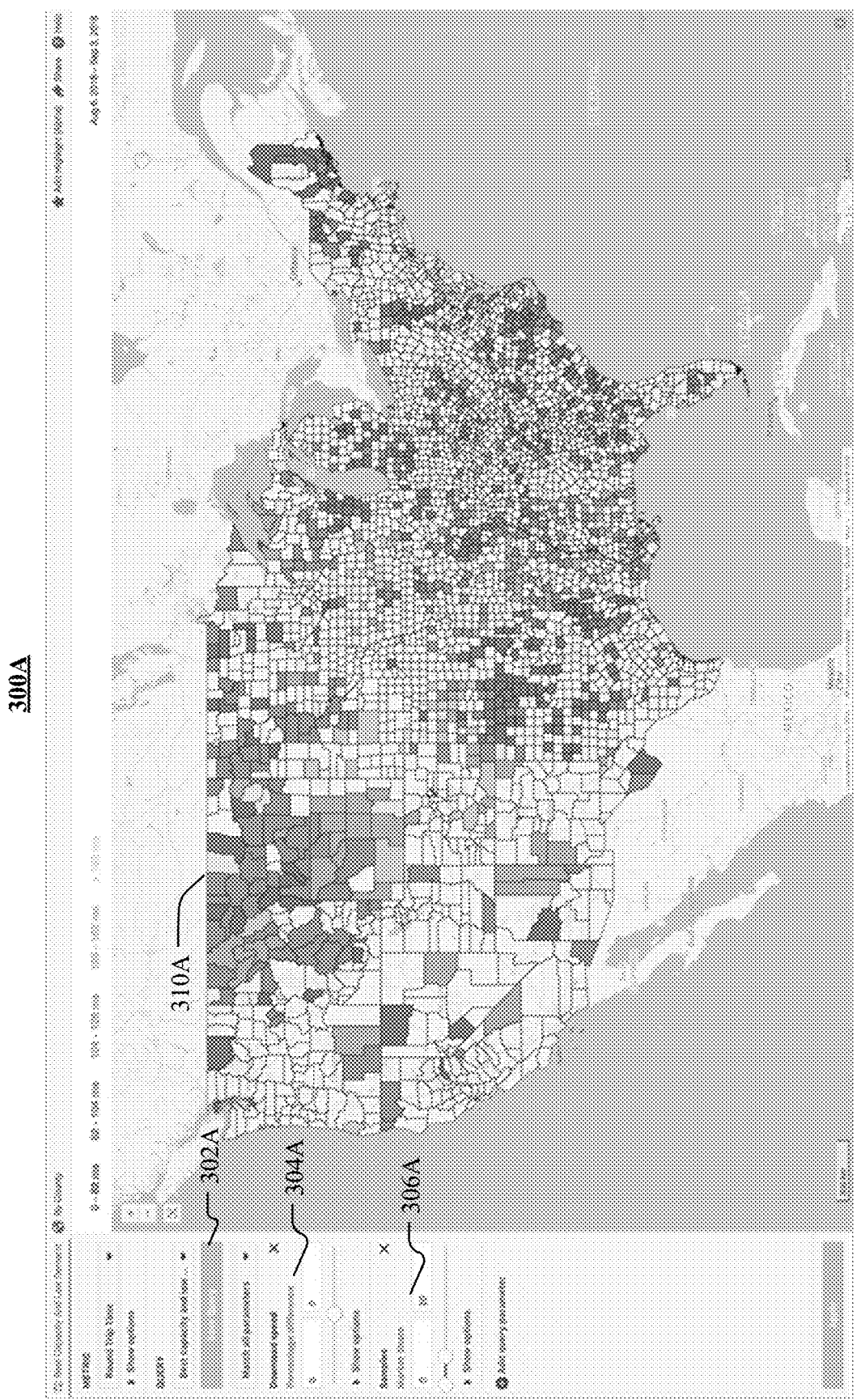
FIGS. 3A-D illustrate example user interfaces for querying the network optimization systems.
Figure 3B:
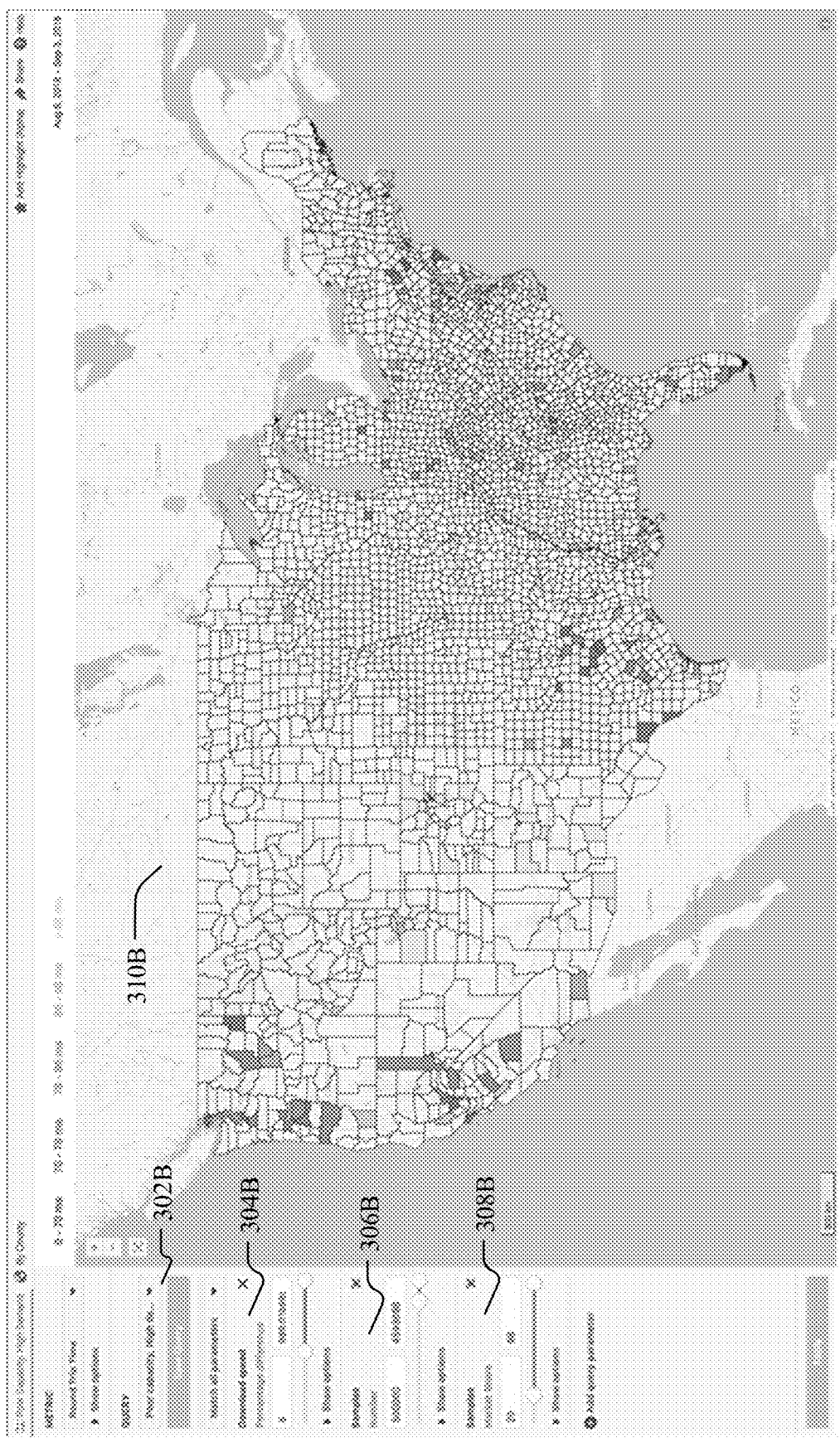

FIGS. 3A-D illustrate example user interfaces (e.g., 300A, 300B, 300C) for querying the network optimization systems. As an example and not by way of limitation, MNOs may query the network optimization system to identify the areas with low connectivity demand and the best network capacity by selecting, inputting, or/and configuring the corresponding query, as shown in FIG. 3A. The MNOs may select a pre-defined or pre-saved query of "best capacity and low demand" from a drop-down list 302A. Or, the MNOs may input or/and configure the corresponding network performance metric threshold manually (e.g., download speed 304A, number of sample 306A). The network performance metric thresholds may be input or configured by MNOs through type-in numbers or by sliding corresponding slider controlling elements. The query result may be displayed in a map 310A including all or a portion (e.g., top percentile) of the high capacity and low demand areas that meet the query criteria or conditions. As another example, the MNOs may query the network optimization system to identify the areas with high connectivity demand and poor network capacity by selecting, inputting, or/and configuring the corresponding query, as shown in FIG. 3B. The MNOs may select a pre-defined or pre-saved query of "poor capacity and high demand" from a drop-down list 302B. Or, the MNOs may input or/and configure the corresponding network performance metric threshold manually (e.g., download speed 304B, number of sample 306B, market share 308B). The network performance metric thresholds may be input or configured by MNOs through type-in numbers or by sliding corresponding slider controlling elements. The query result may be displayed in a map 310B including all or a portion (e.g., top percentile) of the poor capacity and high demand areas that meet the query criteria or conditions.

Figure 3C:
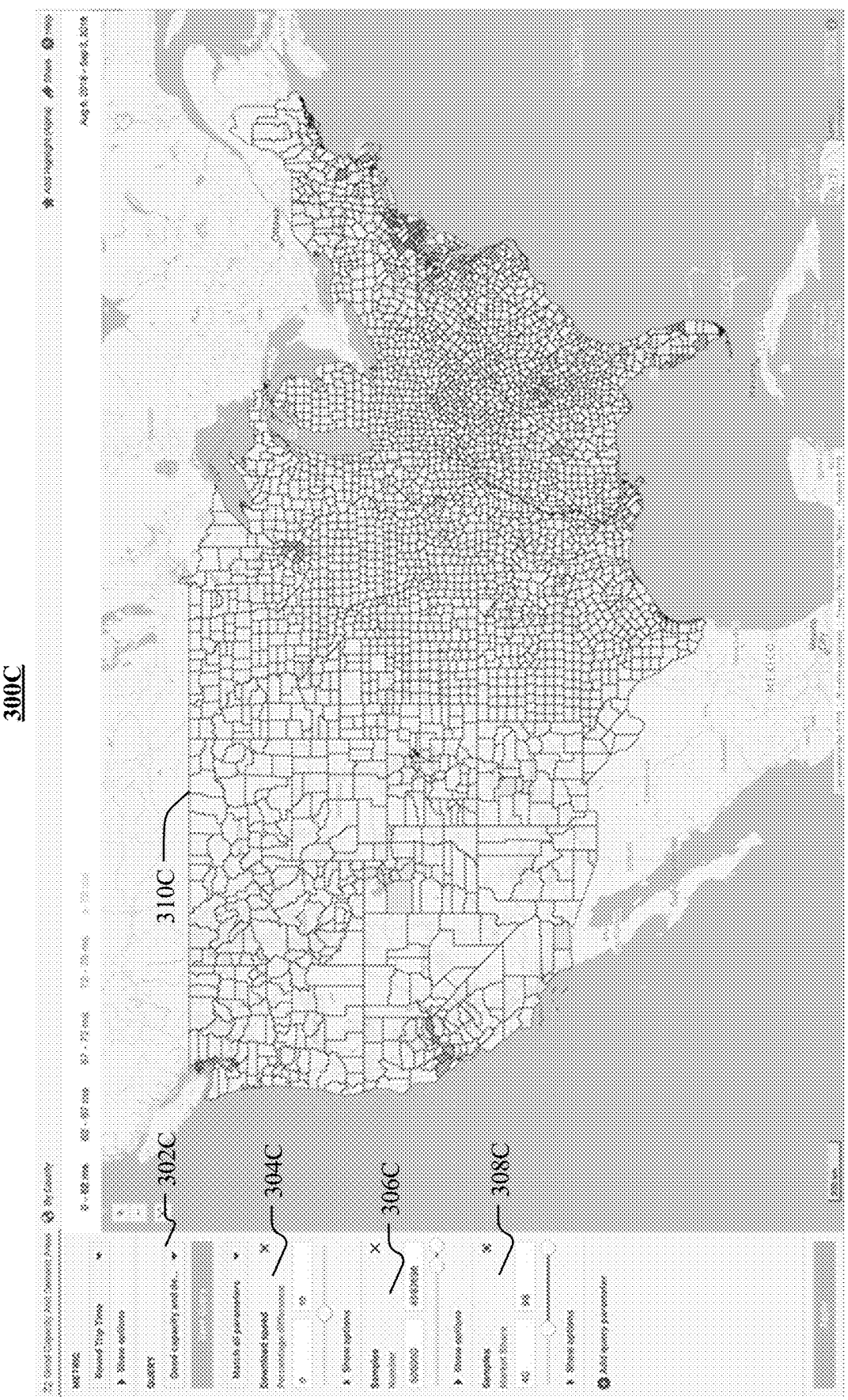
Figure 3D:
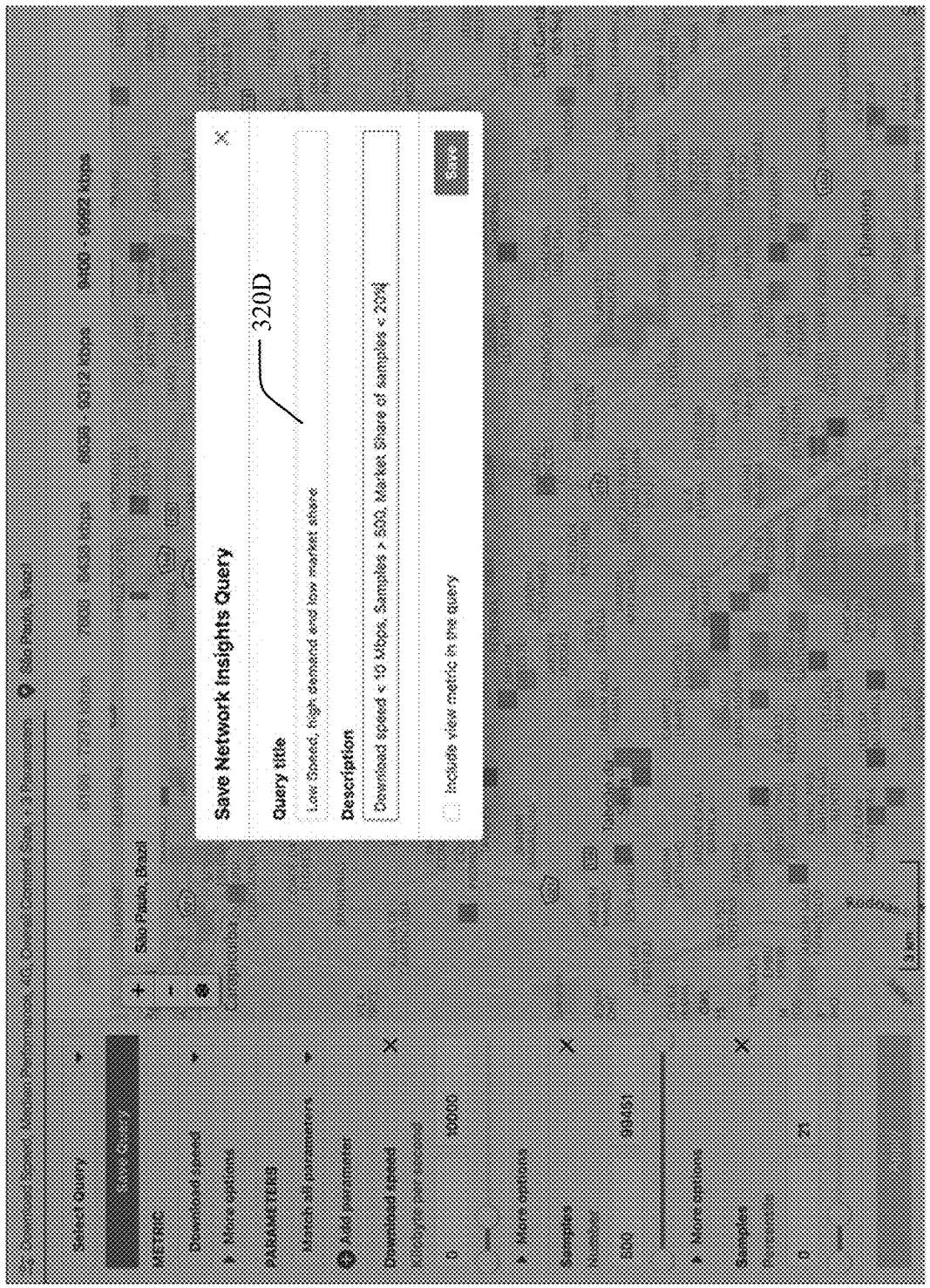

As another example, the MNOs may query the network optimization system to identify the areas with good connectivity demand and good network capacity by selecting, inputting, or/and configuring the corresponding query, as shown in FIG. 3C. The MNOs may select a pre-defined or pre-saved query of "good capacity and demand" from a drop-down list 302C. Or, the MNOs may input or/and configure the corresponding network performance metric threshold manually (e.g., download speed 304C, number of sample 306C, market share 308C). The network performance metric thresholds may be input or configured by MNOs through type-in numbers or by sliding corresponding slider controlling elements. The query result may be displayed in a map 310C including all or a portion (e.g., top percentile) of the good capacity and demand areas that meet the query criteria or conditions. As another example, the MNOs may select a pre-defined or previously stored query from a drop-down menu of a pop-out dialog 320D in the user interface 300D as shown in FIG. 3D.

In particular embodiments, the system may generate standard queries to allow MNOs to easily identify areas of interest based on pre-defined criteria. For example, the system may pre-populate query for "low capacity and high demand" areas or other types of areas that are likely to be interested to the operators. The system may generate and store the standard queries and allow operators to choose from the stored standard queries (e.g., from a drop-down menu) to perform fast query on the system. The system may allow the operators to create their own queries or to customize the standard queries according to the operators' interest. In particular embodiments, the system improves the end to end flow for queries by integrating into the query results one or more customized UI elements (e.g., highlights, customizable dashboards). The system may standardize and productize the measurement of the network performance across different platforms (e.g., from different partners, carriers, providers) and incorporate the all results of efforts from different partners. In particular embodiments, the system may enhance the modeling for queries using ML models which are trained using historical data or pre-labeled data to determine the locations and segments that are most likely to drive value.

Optimization Recommendations
    Optimization Actions
    In particular embodiments, the system may generate one or more network optimization recommendations including one or more recommended optimization actions, for example, but not limited to, network upgrading, adding network links, adding cell towers, tuning cell towers, network traffic offloading, price-segmented service plans, time-based service plans, up-sell plans, running Ads campaigns, matching competitor network performance features, customized service plans for particular customer segments, acquiring customers from competitors, acquiring new customers, etc. In particular embodiments, the system may use the integrated network insights system, pricing system, network congestion detection system and content generating system to generate different optimization recommendations for different areas of interest. For example, for high-capacity and low-demand areas, the pricing system may generate price-segmented service plans for customers of competitor network and new customers to internet. The content generating system may generate a series of content (e.g., Ads campaign) to promote the price-segmented service plans to different customer segments (e.g., customers of competitor networks, new customers to internet, etc.)

As another example, for low-capacity and high-demand areas, the network congestion system may detect one or more network congestion and generate congestion alerts for those areas with network congestions. The network insights system may determine one or more network performance features (e.g., busy hours, non-busy hours, network traffic patterns, network customer features, etc.). The pricing system may generate a time-based service plans with different prices in different time periods (e.g., free network after 10:00 PM, lower prices during non-busy hours) to offload the network traffic from busy time periods to non-busy time periods (e.g., busy hours to non-busy hours, busy days to non-busy days, busy seasons to non-busy seasons, etc.). The content generating system may generate content for promoting the time-based service plans to targeted customers. The system may further generate network optimization recommendations for upgrading the network to improve network capacity. As another example, for high-capacity and high-demand areas, the network insights system may determine one or more network performance features (e.g., low/high revenue per user than other areas, low/high revenue per user than competitive networks, low/high churning rate than other areas, low/high revenue per use than competitive networks, etc.). The system may generate network optimization recommendation for upgrading the network and improving the network capacity or up-sell plans to reduce the user churning rate. The content generating system may generate content for promoting up-sell plans to the targeted customer segments.

In particular embodiments, the system may generate network optimization recommendation excluding (or recommending against executing) one or more optimization actions. For example, the system may determine that an area of interest, although with low network performance and poor quality of experience, has low connectivity demand with small number of potential customers in this area. On the other hand, the system may determine that an optimization action which may improve the network performance is not economically feasible considering the cost and return of investment. The system may generate optimization recommendation excluding this optimization action or recommend against executing this optimization action. By recommending not to take certain optimization actions, the system may generate recommendations that are valuable for MNOs to avoid executing the optimization actions that may have negative economic impact. In particular embodiments, a completed optimization action may refer to an optimization action that has been taken and completed (e.g., on particular areas of interest) in the past. A recommended optimization action may refer to an optimization action that has been recommended to be executed (e.g., on certain areas on interest).

Network Performance Features

In particular embodiments, the system may determine one or more network performance features associated with one or more of the identified areas of interest and generate network optimization recommendations which are customized for each identified areas of interests based on the network performance features of that area. In particular embodiments, the system may determine that particular optimization actions have been proved to be effective to certain areas of interest or certain types of areas of interest. The effective optimization actions may be determined based on historical data of these areas of interest or similar areas of interest. The system may determine that an optimization action is effective to particular areas based on the network performance improvements (e.g., a number of areas have improved network performances, a degree of improvement in these areas, a network efficiency, improvements of network performance metrics, etc.) The system may generate network optimization recommendations for particular areas based on the optimization actions that are proved to be effective for those areas or similar areas.

In particular embodiments, the system may determine that the areas of interest have particular customer features and generate network optimization recommendations based on the customer features. The customer features may include, for example, but are not limited to, demographic features, time-spent on network, ability to pay, age, occupation, social network activities, social network profiles, data consuming history, customer devices, geographical distributions, etc. The system may generate optimization recommendations based on the customer features of the areas of interest. As another example, if an area of interest has many quality-demanding customers who are willing to pay high prices for better quality of experience, the system may generate high-end service plans with best quality of experience to increase the revenue per user.

In particular embodiments, the system may predict (e.g., using ML model trained by history data or pre-labelled data) the network performance improvement or impacts of the recommended optimization actions in the areas of interest and generate optimization recommendations based on the predicted improvement or impact. In particular embodiments, the system may use a cost-revenue model to determine the cost of an optimization action and predict the revenue change of the network caused by the optimization action. The system may generate optimization recommendations based on the cost and predicted revenue change. In particular embodiments, the system may determine network performance features for an area of interest at granular level. For example, the system may divide the area of interest into a number of sub-regions and determine the network performance features based on data collected from the sub-regions which provide more accurate and precise data. The system may recommend optimization actions based on the granular level network performance features.

In particular embodiments, the system may detect network congestions in one or more areas covered by the communication network. The system may perform root cause analysis to determine the root causes of the network congestions in these areas and recommend optimization actions based on the determined root causes. In particular embodiments, the system may predict the user behaviors (e.g., likelihood to switch networks) based on some signals in an acquisition model (e.g., switch SIM card as signals for switching carriers) and generate network optimization recommendations based on the predicted customer behaviors. For example, the content generating system may generate Ads campaign to acquire the customers that are predicted to be likely acquirable and to retain the customer that are predicted to churn to competitor networks. In particular embodiments, the network performance features may include a network status indicated by one or more network performance metric values. In particular embodiments, the network performance features may include one or more network performance metrics themselves.

Priority

In particular embodiments, the system may determine a priority value for an optimization action associated with an area of interest. For example, the system may determine that an area of interest has serious network congestion that negatively impact the quality of experience of a large number of users in that area. The system may assign a high priority value to the recommended optimization actions (e.g., network traffic offloading, time-based pricing, network upgrading, etc.) for that area of interest. As another example, the system may identify an area of interest with high connectivity demand and low network capacity, which negatively impact the revenue in this area of interest. The system may assign a high priority value to the recommended optimization actions (e.g., network traffic offloading, adding cell towers, network upgrading, etc.) for that area of interest. As another example, the system may identify that an area of interest is associated with optimization actions that are proved to be effective to improve the network performance (e.g., increasing network revenue, acquiring more customers, improving networks speeds) in this area or similar types of area. The system may assign a high priority value to the optimization actions that have been proved to be effective for this area of interest. As another example, the system may determine that an area of interest may be effectively optimized by a particular optimization action (e.g., relative low-cost optimization actions) within a reasonable budget. The system may assign a high priority value to the optimization actions within the reasonable budget for this area of interest. As another example, the system may determine that an area of interest, although with poor network performance, has low connectivity demand (e.g., small number of samples or requests) and optimizing this area may not result in revenue increase. The system may assign a low priority value to the optimization actions for this area of interest.

Targeted Optimizations

In particular embodiments, the system provide targeted network optimizations through the integration of multiple sub-systems. Instead of targeting only marketing channel, the system may provide many kinds of targeted network optimizations including, for example, but not limited to, targeted network users, targeted optimization regions, targeted optimization time windows, targeted optimization actions, etc. For example, the system may use the query inputs from the operators to identify a number of targeted areas to be optimized. As another example, the system may identify a number of optimization actions for a particular area in which the optimization actions have been proved to be effective (e.g., based on historical data).

Figure 4A:
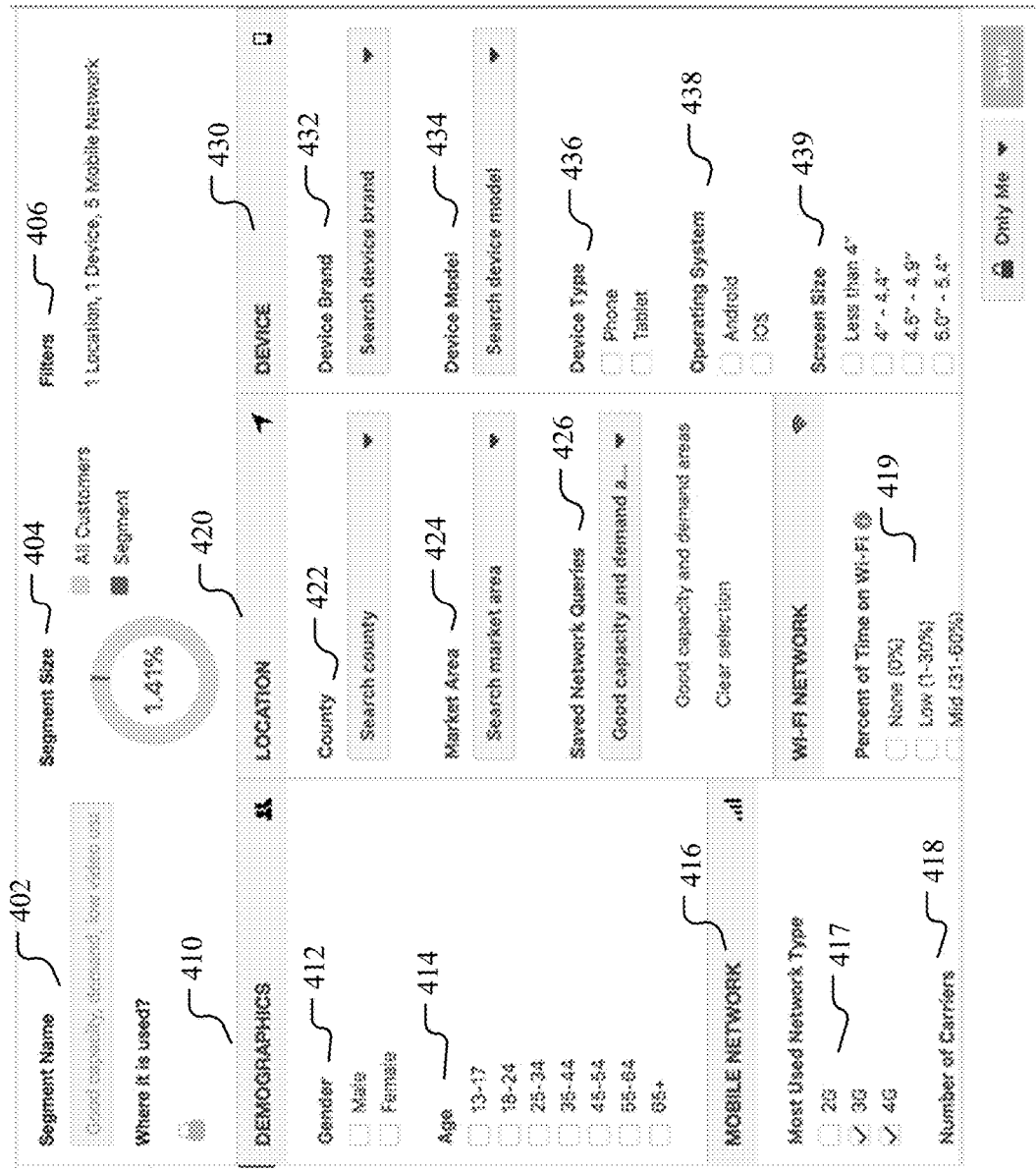
FIGS. 4A-C illustrate example user interfaces for configuring network optimization actions with targeted customers.
Figure 4B:
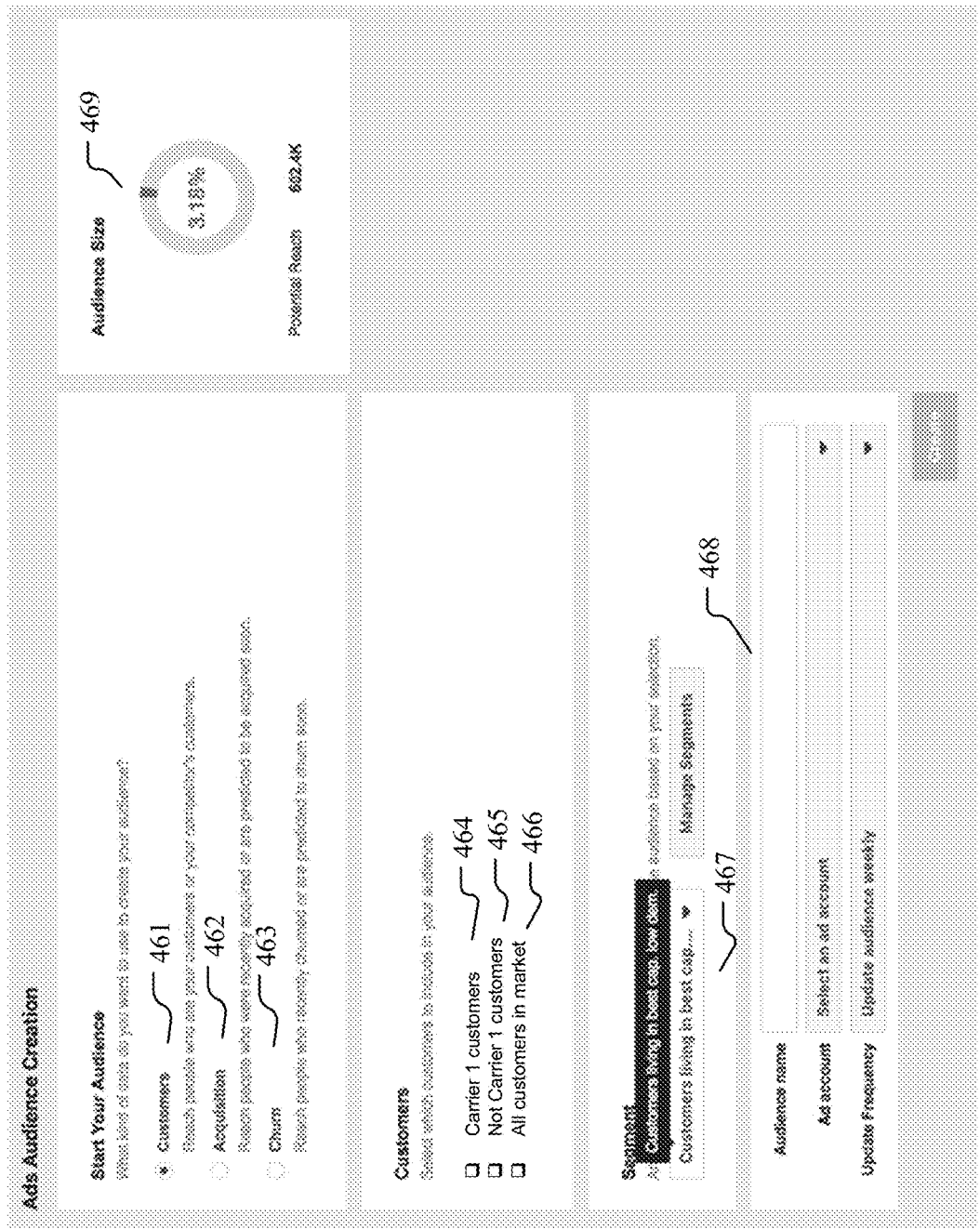
Figure 4C:
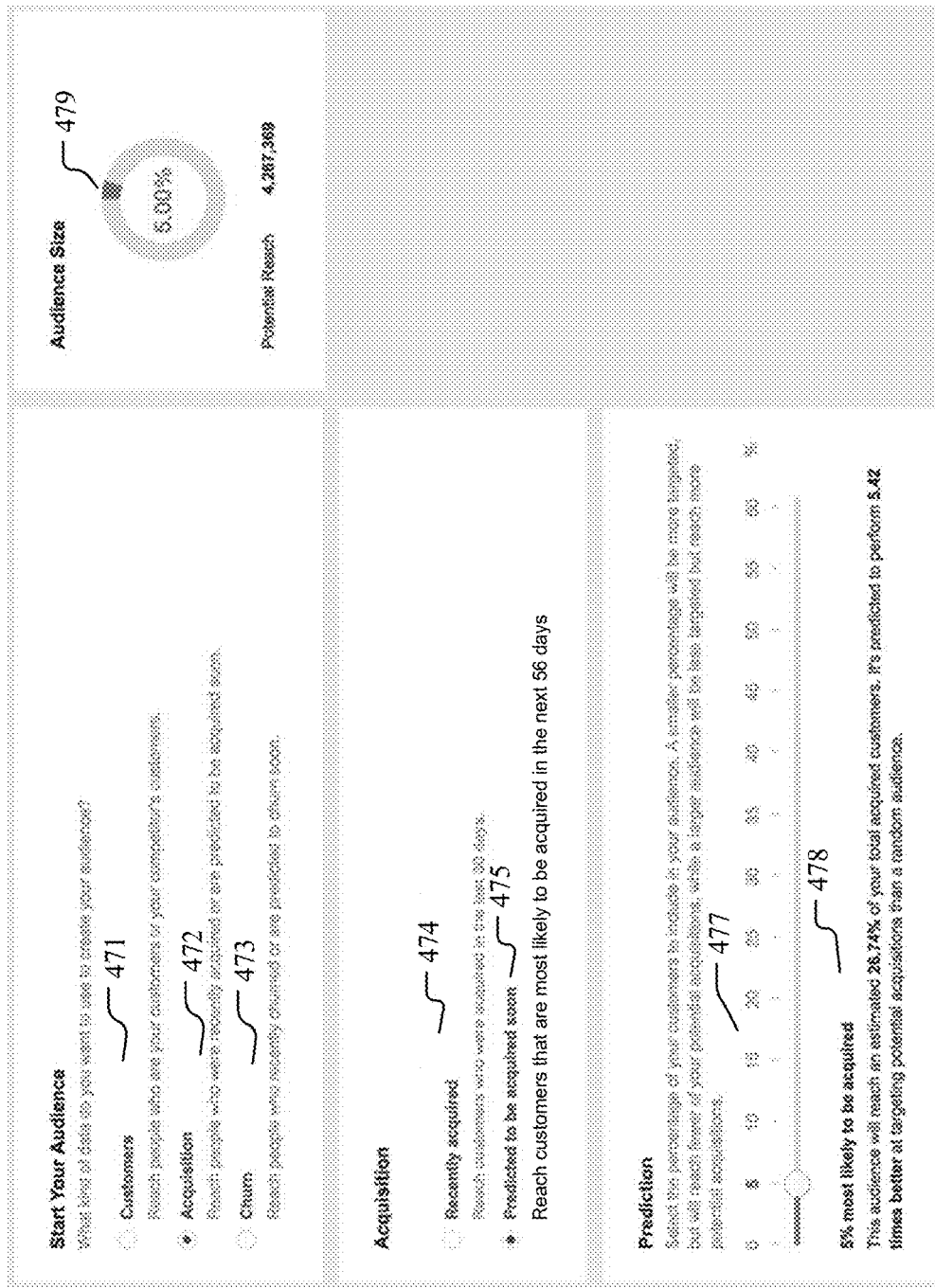

FIGS. 4A-C illustrate example user interfaces (e.g., 400A, 400B) for configuring network optimization actions with targeted customers. As shown in FIG. 4A, the system may allow MNOs to specify particular segments of targeted customers (e.g., customers in the areas with high network capacity, high demand, and low videos usage rate). For example, the MNOs may specify customer segments via the segment name 402, the segment size 404, and filters 406 (e.g., by locations, by devices, by mobile networks). As another example, the MNOs may specify customer segments with particular demographic information 410, such as, gender 412, age 414, etc. As another example, the MNOs may specify customer segments by locations 420, such as, country 422, market area 424, saved network queries 426, etc. As another example, the MNOs may specify customer segments by devices 430, such as, device brands 432, device models 434, device types 436 (e.g., phone, tablet), operating systems 438 (e.g., iOS, Android) screen size 439, etc. As another example, the MNOs may specify the customer segments by mobile network types 416 (e.g., most used network types 417, such as, 2G, 3G, 4G, 5G) and number of carriers 418. As another example, the MNOs may specify customer segments by percentage of time on Wi-Fi 419.

As shown in FIG. 4B, the MNOs may specify the targeted customer segments which include customers with particular customer features. For example, the MNOs may specify the targeted customers based on associated networks 461 (e.g., the current customers of the communication network or the customers of a competitor's network). As another example, MNOs may specify the targeted customers based on acquisition status 462 (e.g., recently acquired customers, customers predicted to be acquired soon). As another example, the MNOs may specify the targeted customers based on the churning status 463 (e.g., customers who recently turned or are predicted to churn soon). As another example, the MNOs may specify the targeted customers associated with a particular carrier 464, not associated with a particular carrier 465, or all customers in the market 466. As another example, the MNOs may select pre-defined or previously saved customer segments from a drop-down menu 467. The user interface 400B may also include a region 468 including text input regions and drop-down lists to allow the MNOs to configure the settings related to an Ads campaign (e.g., audience name, Ads account, update frequency to audience). The user interface 400B may include a pie chart 469 displaying the audience size (e.g., percentage of customers, number of customers to reach) corresponding the customer segments specified in the user interface 400B.

As shown in FIG. 4C, the MNOs may specify the targeted customers based on associated networks 471 (e.g., the current customers of the communication network or the customers of a competitor's network), customer acquisition status 472 (e.g., recently acquired customers, customers predicted to be acquired soon), churning status 473 (e.g., customers who recently turned or are predicted to churn soon), customers that are recently acquired 474 (e.g., in the past 30 days), customers that are predicted to be acquired soon 475, etc. Furthermore, the MNOs may specify a customer percentage (e.g., 5%) that will be reached by the recommended optimization actions (e.g., Ads campaign promoting service plans). The customer percentage number may be set by the MNOs through a slider element 477. The system may predict an efficiency factor (e.g., 5.42 time better) for targeting potential customers than a random audience and display the prediction result 478 in the user interface 400C. The user interface 400C may include a pie chart 479 displaying the audience size (e.g., percentage of customers, number of customers to reach) corresponding the customer segments specified by the MMOs in the user interface 400C.

Figure 4D:
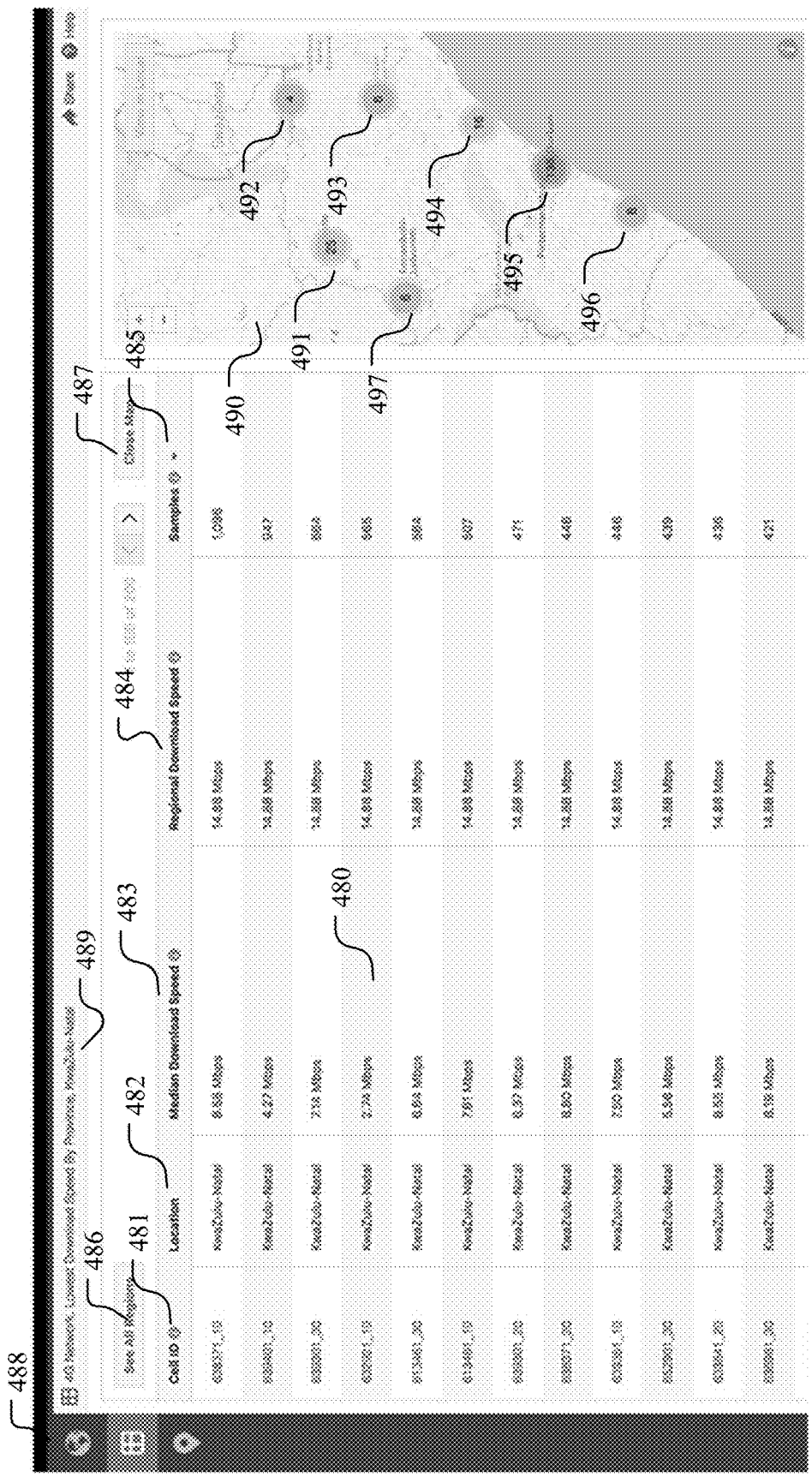
FIG. 4D illustrates an example user interface for displaying the identified areas for optimization.

FIG. 4D illustrates an example user interface 400D of the system displaying the identified areas (e.g., 491, 492, 493, 494, 495, 496, 497) for optimization. For example, the user interface 400C may include a map 490 showing the areas identified in the query process (e.g., areas with network congestions). Each identified area (e.g., area with network congestion) may be indicated by a circular indicator and a number within the circular indicator. Each area may be associated one or more cells. Each cell may include one or more cell towers and each cell tower may include one or more cell sectors. In particular embodiments, the number in the circular indicators may indicate the number of detected congestion alerts in the associated area. In particular embodiments, the circular indicator may be displayed with different colors to indicate the severity of the network congestions. The user interface 400C may further include a table 480 showing a list of cell alerts indicating the cells with network congestions or cells with different network speeds. Each row of the table 480 may include a cell alert and each column of the table 480 may be corresponding to a supporting attribute associated with the cell alert (e.g., cell identification 481, location 482, median download speed 483, regional download speed 484, number of samples or requests 485, etc.). The user interface 400C may further include a header section 489 indicating the current query and a number buttons (e.g., 486, 487, 488). The button 486 may be used for specifying the regions that will be displayed in the user interface 400C. The button 487 may be used for closing the map 490. The buttons 488 may be used to switch between different display modes (e.g., table view, map view, location view). The list of cell alerts in the table 489 may be ranked by one or more of the associated attributes. For example, the list of cell alerts in 400D may ranked by the number of samples from the highest to lowest. In particular embodiments, the list of cell alerts may be ranked by other attributes, such as, cell identifications 481, locations 482, median download speeds 483, regional download speed 484, number of sample or requests 485, etc.

Competitive Perspective

Figure 4E:
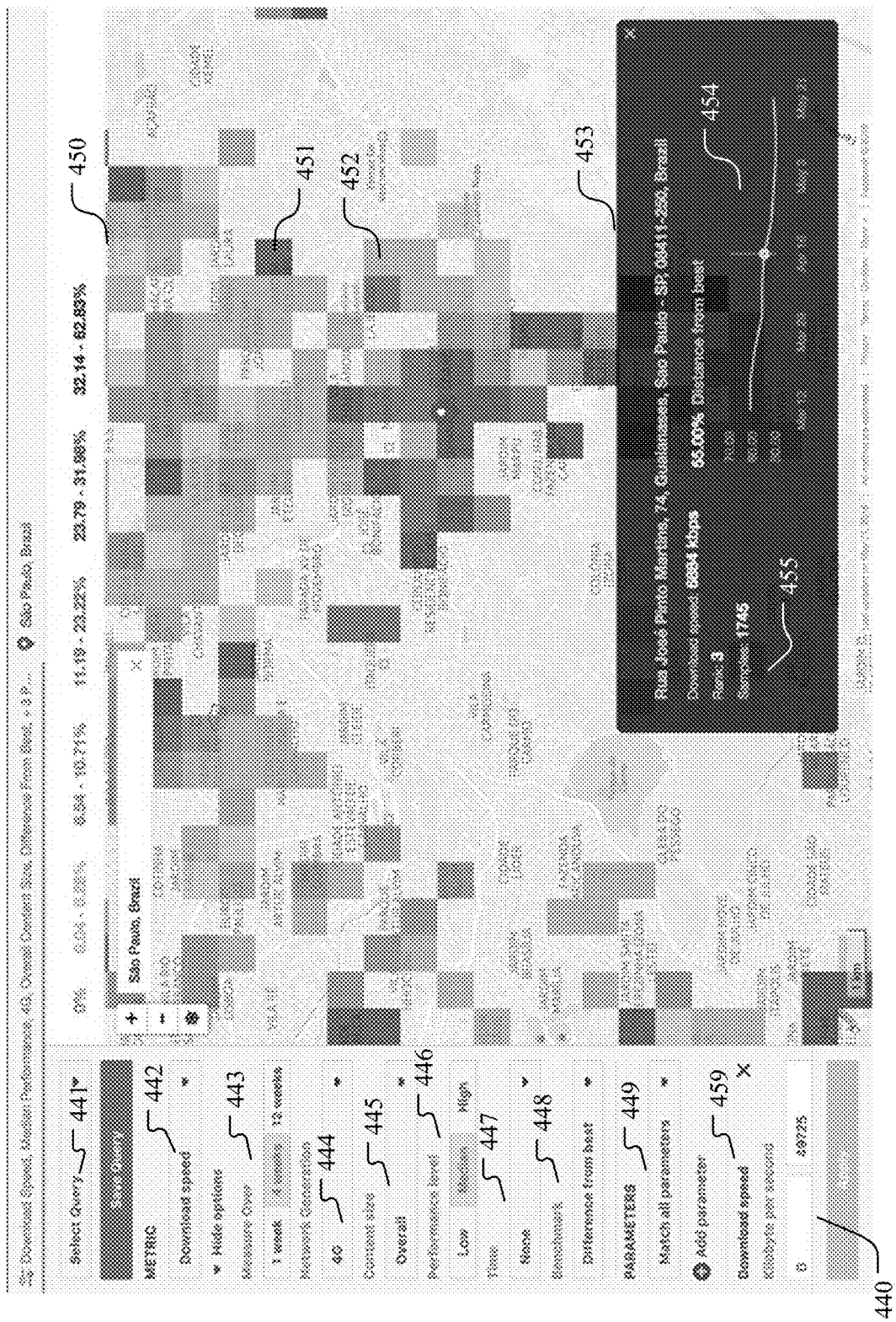
FIG. 4E illustrates an example user interface displaying network performance data with competitive perspective.

FIG. 4E illustrates an example user interface 400E displaying network performance data with competitive perspective. In particular embodiments, the system may collect the network performance data from multiple communication network platforms (e.g., including competitor's networks). The system may compare the network performance of different communication network and provide competitive perspective for MNOs. As an example and not by way of limitation, the user interface 400E may include a setting panel 440 which may allow MNOs to select or configure the network performance data to be displayed by setting a number of network parameters or metrics including, for example, query 441, metric 442 (e.g., download speed), time periods 443, network generation 444, content size 445, performance level 446 (e.g., low, median, high), time 447, benchmark 448 (e.g., difference from best), parameter matching conditions 449 (e.g., matching all or a portion of the parameters), download speed value 459, etc. The user interface 400E may include a map 450 showing areas (e.g., 451, 452) with different network performance status. The user interface 400E may including a display area 453 display the network performance data and comparative information. For example, the display area 453 may display a chart 454 showing distance or difference (e.g., in percentage) of the current communication network from the best network benchmark (e.g., the best network, the best network performance) over a period of time (e.g., days weeks, months, years). The display area 453 may also display network performance information 454, such as, download speed, rank, number of samples, etc.

EXAMPLES

High-Capacity and Low-Demand Areas Optimization

In particular embodiments, the system may identify a number of areas in the network that have high network capacity and low connectivity demand. In particular embodiments, the system may automatically segment the region of interest (e.g., the high capacity and low demand region) into granular level sub-regions (e.g., tiles, zip code regions, polygons) and each of the sub-region may fit into this category of low-demand and high-capacity. For example, the system may run a query to identify the sub-regions that meet the requirements of low-demand and high-capacity using the social network application data. In particular embodiments, for newly built networks in a region (e.g., a city), the system may identify areas meeting one or more of the following conditions: (1) the population is very high; (2) people spend long time on internet (e.g., videos, social networks); (3) most people are using competitor's networks; and (4) the newly built network has low market share. The system may identify the potential customers in these areas and determine that the newly built network has the capacity to handle the potential customers with reasonable network speed. Then, the system may generate network optimization recommendations for acquiring these potential customers.

As an example and not by way of limitation, the system may identify a region (e.g., a city) which has newly built or newly upgraded networks (e.g., 4G networks, fiber networks, cellular towers) but the majority of customers are still using the pre-existing slower networks (e.g., 2G or 3G networks). The newly upgraded network may have a higher cost for the consumer but provide higher network speeds than the pre-existing networks. As another example, the system may identify, based on application data, a number of areas having good download speed, less latency, and high population density, but the network has a low market share.

In particular embodiments, the system may generate optimization recommendations based on the network performance features associated with the areas to be optimized and a number of network metrics or parameters, for example, the number of people that are connected by internet, the number of people having means to pay, available budget for improving network, data plan pricing, etc. In these high-capacity and low-demand areas, the network capacity may have certain amount of margin that is not utilized to its full potential. The system may generate optimization recommendation to improve the utilization efficiency of the network capacity in these areas. For example, the system may generate optimization recommendations for reducing the cost to consumers to drive more volume of customers, and therefore improve overall revenues and network efficiency. The system may use the pricing system to generate different segmented low-price data plans, for example, regional/global low cost or free social network access for a number of days, free 3 months data plan for images and videos within the capacity of the network, etc. The segmented low-price data plans may allow people to have a cheaper way to access the internet, and therefore increases the funnel of people being connected. The system may use the content generating system to generate an Ads campaign to promote the low-price or free data plans to targeted customers in targeted areas. The system may generate optimization recommendations for retail operations (e.g., cheaper SIM cards, more retail site presence, branding) to acquire more customers. The system may predict the customer acquisition results (e.g., number of new customers, number of customers switched from competitors, acquisition rate, acquisition cost per customers), the network performance with the newly acquired customers, and the network revenue increase. The revenue per person may be likely go down with the low-price data plans but the overall revenue and profit could be improved because more people are connected by the network. As a result of the optimization, the overall network could be more accessible and affordable to the consumers while the network generates more revenue in these areas.

Low-Capacity and High-Demand Areas Optimization

In particular embodiments, the system may identify a number of areas in the network that have low network capacity and high connectivity demand. For example, the system may identify (e.g., based on application data or/and infrastructure data) areas with poor download speed and latency, network congestions, high population, high market share, or/and high churn rate. As another example, the system may identify areas where the network does not have enough capacity to support more users or more traffic (e.g., because the network has too many users already), or the cost per consumer cannot be reduced (e.g., because the operation cost is very high or the cost to consumer is already too low).

In particular embodiments, the system may collect the application data in a number of areas of the network and use the network congest detection system to detect network congestions in those areas based on the collected application data. Then, the system may use the network insights system to determine other network performance features of the congested areas. The network performance features may include information related to, for example, congestion alerts, peak traffic amount, peak traffic hours, busy hours, non-busy hours, network capacity, number of requests, etc. Then, the system may generate optimization recommendations based on the network performance features. As an example, the system may use the pricing system to generate segmented pricing recommendations providing costumers free or lower price data plans at non-busy hours (e.g., after 10:00 PM) to shift the peak traffic from busy hours to non-busy hours in these particular areas. The system may use the content generating system to generate Ads campaign recommendations to promote this offer to consumers. As another example, the system may generate optimization recommendations which prioritize particular areas (e.g., cell tower in congested areas) to improve to network capacity at reasonable cost. The system may help MNOs to identify these areas and improve the network speed in those areas. As another example, the system may generate optimization recommendations for retail operations to provide cheaper night time data plans for costumers to shift the peak traffic at daytime to non-busy night hours.

High Capacity and High Demand Areas

In particular embodiments, the system may identify a number of areas in the network that have high network capacity and high connectivity demand. For example, the system may identify a region (e.g., a city) where customers are relative wealthy and the network revenue is great but there are a lot of competition in this region. The system may generate network optimization recommendations to increase the average revenue per user and reduce churn rate, for example, using up-sell (e.g., new devices, data plans) or/and cross-sell (e.g., ISP). The system may use the integrated content generating system to generate segmented Ads to reach targeted customers. The system may predict the customer behaviors (e.g., device upgrading) and customize the Ads content to improve the efficacy of the segmented Ads campaign.

In particular embodiments, the system may generate network optimization recommendations for increasing average revenue per user and reduce churn rate by improving network performance comparing to the competitors. The network optimization recommendations may be based on the network performance features at granular level (e.g., local network status). Within the same region, the system may generate different optimization recommendations for different sub-regions according to the corresponding localized network insights. For example, in a first sub-region, the system may recommend shifting peak traffic to non-busy hours. In a second sub-region, the system may recommend segmented pricing. In some other sub-regions, the system may recommend upgrading the cellular tower with reasonable cost. The system may provide more flexible and granular budget allocation and maximize the efficacy for improving the network performance with limited investment. The system may provide a rich set of services to help operators to identify problematic areas in a faster way and with a completive view (e.g., using social network application data across all operator in markets). In particular embodiments, the system may provide a powerful combination of marketing channel, pricing channel, vendor integration, and network integration with social network platform. The system may allow operators to optimize the investment budget to improve the network performance more efficiently.

Low-Capacity and Low Demand Areas

In particular embodiments, the system may identify a number of areas in the communication network that have low network capacity and low connectivity demand (e.g., jungle areas, small settlements, low density of people, high cost to connect). These areas may not able to be connected profitably. However, the system may use different investment model to generate possible connectivity solutions by leveraging the revenue from other profitable areas to invest in these non-profitable areas.

Example Method

Figure 5:
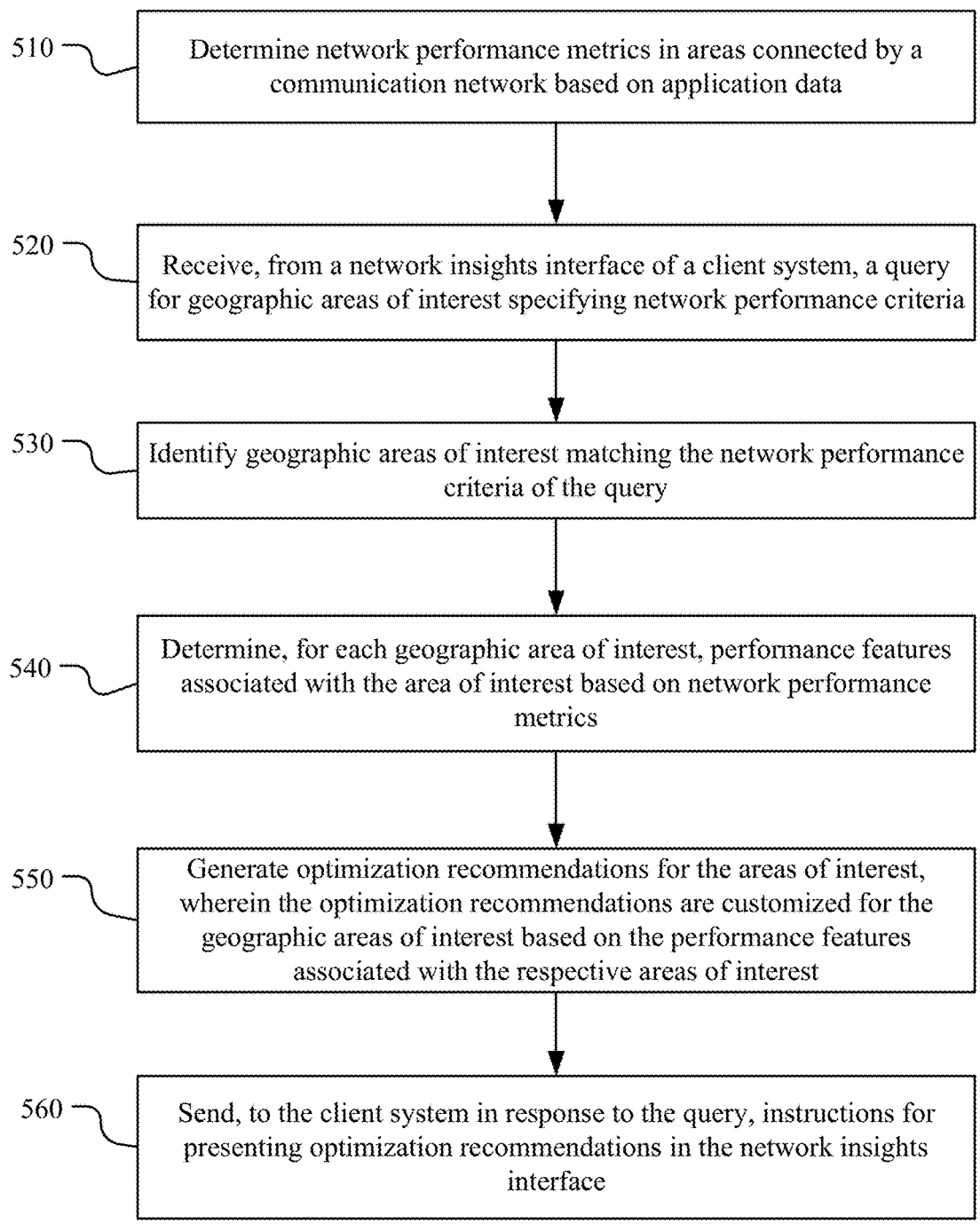
FIG. 5 illustrates an example method for generating network optimization recommendations.

FIG. 5 illustrates an example method for generating network optimization recommendations. The method may begin at step 510, where the network optimization system may determine one or more network performance metrics in a number of geographic areas connected by the communication network. The system may determine the network performance metrics based on the application data of a number of end users of the communication network. The application data may be collected from the geographic areas covered by the communication network. At step 520, the system may receive, from a network insights interface of a client system, a query for geographic areas of interest within the communication network. The query may specify one or more network performance criteria for the geographic areas of interest. The network performance criteria may include one or more of the network performance metrics and one or more metric thresholds corresponding to those network performance metrics. At step 530, the system may identify one or more geographic areas of interest matching the one or more network performance criteria of the query. Each identified geographic area may contain communication infrastructure connected by the communication network. At step 540, the system may determine, for each geographic area of interest, one or more performance features associated with the geographic area of interest based on the one or more network performance metrics derived from the application data of end users collected from the one or more geographic areas of interest. At step 550, the system may generate one or more optimization recommendations for one or more of the geographic areas of interest. The generated optimization recommendations may be customized for the geographic areas of interest based on the one or more performance features associated with the respective geographic areas of interest. At step 560, the system may send, to the client system in response to the query, instructions for presenting one or more of the optimization recommendations in the network insights interface. The optimization recommendation may be displayed on the network insights interface to the MMOs in response to the query. In particular embodiments, the system may optimize the communication network (e.g., running Ads campaign, offloading network traffic) based on the generated network optimization recommendations. In particular embodiments, the system may detect (e.g., using a network congestion system) one or more network congestions in the one or more geographic areas. The system may determine (e.g., using a pricing system) one or more pricing rules for one or more services provided by the communication network. Then, the system may generate (e.g., using a content generating system) a series of content elements (e.g., Ads content) for the one or more services based on the pricing rules. The generated content elements may be associated with and targeted to one or more groups of end users or customers in one or more geographic areas. The system may generate optimization recommendations based on the detected network congestions, the pricing rules, or/and the generated content elements.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for generating network optimization recommendations including the particular steps of the method of FIG. 5, this disclosure contemplates any suitable method for generating network optimization recommendations including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

System Overview

Figure 6:
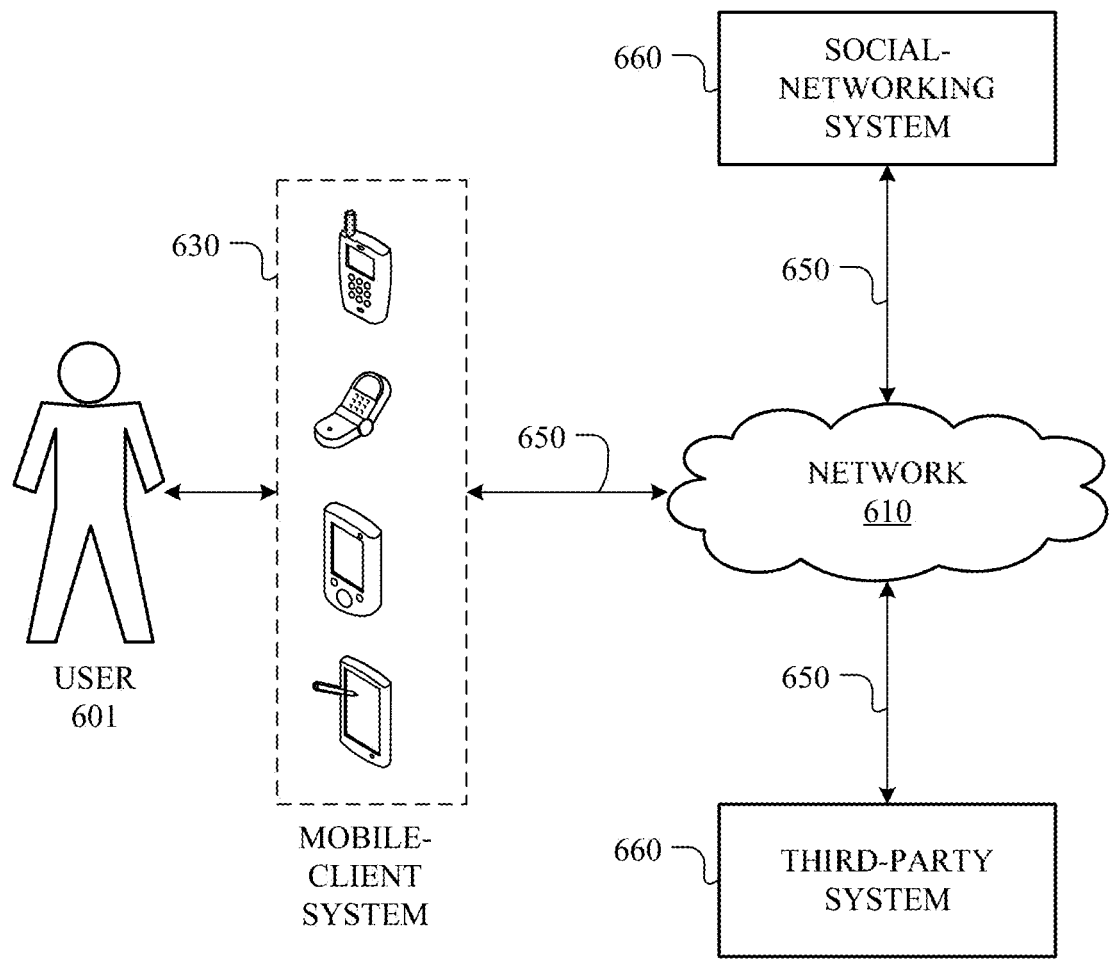
FIG. 6 illustrates an example network environment associated with a social-networking system.

FIG. 6 illustrates an example network environment 600 associated with a social-networking system. Network environment 600 includes a client system 630, a social-networking system 660, and a third-party system 670 connected to each other by a network 610. Although FIG. 6 illustrates a particular arrangement of client system 630, social-networking system 660, third-party system 670, and network 610, this disclosure contemplates any suitable arrangement of client system 630, social-networking system 660, third-party system 670, and network 610. As an example and not by way of limitation, two or more of client system 630, social-networking system 660, and third-party system 670 may be connected to each other directly, bypassing network 610. As another example, two or more of client system 630, social-networking system 660, and third-party system 670 may be physically or logically co-located with each other in whole or in part. Moreover, although FIG. 6 illustrates a particular number of client systems 630, social-networking systems 660, third-party systems 670, and networks 610, this disclosure contemplates any suitable number of client systems 630, social-networking systems 660, third-party systems 670, and networks 610. As an example and not by way of limitation, network environment 600 may include multiple client system 630, social-networking systems 660, third-party systems 670, and networks 610.

This disclosure contemplates any suitable network 610. As an example and not by way of limitation, one or more portions of network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 610 may include one or more networks 610.

Links 650 may connect client system 630, social-networking system 660, and third-party system 670 to communication network 610 or to each other. This disclosure contemplates any suitable links 650. In particular embodiments, one or more links 650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout network environment 600. One or more first links 650 may differ in one or more respects from one or more second links 650.

In particular embodiments, client system 630 may be an electronic device including hardware, software, or embedded logic components or a combination of two or more such components and capable of carrying out the appropriate functionalities implemented or supported by client system 630. As an example and not by way of limitation, a client system 630 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 630. A client system 630 may enable a network user at client system 630 to access network 610. A client system 630 may enable its user to communicate with other users at other client systems 630.

In particular embodiments, client system 630 may include a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 630 may enter a Uniform Resource Locator (URL) or other address directing the web browser 632 to a particular server (such as server 662, or a server associated with a third-party system 670), and the web browser 632 may generate a Hyper Text Transfer Protocol (HTTP) request and communicate the HTTP request to server. The server may accept the HTTP request and communicate to client system 630 one or more Hyper Text Markup Language (HTML) files responsive to the HTTP request. Client system 630 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 660 may be a network-addressable computing system that can host an online social network. Social-networking system 660 may generate, store, receive, and send social-networking data, such as, for example, user-profile data, concept-profile data, social-graph information, or other suitable data related to the online social network. Social-networking system 660 may be accessed by the other components of network environment 600 either directly or via network 610. As an example and not by way of limitation, client system 630 may access social-networking system 660 using a web browser 632, or a native application associated with social-networking system 660 (e.g., a mobile social-networking application, a messaging application, another suitable application, or any combination thereof) either directly or via network 610. In particular embodiments, social-networking system 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 662 may include hardware, software, or embedded logic components or a combination of two or more such components for carrying out the appropriate functionalities implemented or supported by server 662. In particular embodiments, social-networking system 660 may include one or more data stores 664. Data stores 664 may be used to store various types of information. In particular embodiments, the information stored in data stores 664 may be organized according to specific data structures. In particular embodiments, each data store 664 may be a relational, columnar, correlation, or other suitable database. Although this disclosure describes or illustrates particular types of databases, this disclosure contemplates any suitable types of databases. Particular embodiments may provide interfaces that enable a client system 630, a social-networking system 660, or a third-party system 670 to manage, retrieve, modify, add, or delete, the information stored in data store 664.

In particular embodiments, social-networking system 660 may store one or more social graphs in one or more data stores 664. In particular embodiments, a social graph may include multiple nodes—which may include multiple user nodes (each corresponding to a particular user) or multiple concept nodes (each corresponding to a particular concept)—and multiple edges connecting the nodes. Social-networking system 660 may provide users of the online social network the ability to communicate and interact with other users. In particular embodiments, users may join the online social network via social-networking system 660 and then add connections (e.g., relationships) to a number of other users of social-networking system 660 to whom they want to be connected. Herein, the term "friend" may refer to any other user of social-networking system 660 with whom a user has formed a connection, association, or relationship via social-networking system 660.

In particular embodiments, social-networking system 660 may provide users with the ability to take actions on various types of items or objects, supported by social-networking system 660. As an example and not by way of limitation, the items and objects may include groups or social networks to which users of social-networking system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 660 or by an external system of third-party system 670, which is separate from social-networking system 660 and coupled to social-networking system 660 via a network 610.

In particular embodiments, social-networking system 660 may be capable of linking a variety of entities. As an example and not by way of limitation, social-networking system 660 may enable users to interact with each other as well as receive content from third-party systems 670 or other entities, or to allow users to interact with these entities through an application programming interfaces (API) or other communication channels.

In particular embodiments, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating social-networking system 660. In particular embodiments, however, social-networking system 660 and third-party systems 670 may operate in conjunction with each other to provide social-networking services to users of social-networking system 660 or third-party systems 670. In this sense, social-networking system 660 may provide a platform, or backbone, which other systems, such as third-party systems 670, may use to provide social-networking services and functionality to users across the Internet.

In particular embodiments, a third-party system 670 may include a third-party content object provider. A third-party content object provider may include one or more sources of content objects, which may be communicated to a client system 630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 660 also includes user-generated content objects, which may enhance a user's interactions with social-networking system 660. User-generated content may include anything a user can add, upload, send, or "post" to social-networking system 660. As an example and not by way of limitation, a user communicates posts to social-networking system 660 from a client system 630. Posts may include data such as status updates or other textual data, location information, photos, videos, links, music or other similar data or media. Content may also be added to social-networking system 660 by a third-party through a "communication channel," such as a newsfeed or stream.

In particular embodiments, social-networking system 660 may include a variety of servers, sub-systems, programs, modules, logs, and data stores. In particular embodiments, social-networking system 660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 660 may also include suitable components such as network interfaces, security mechanisms, load balancers, failover servers, management-and-network-operations consoles, other suitable components, or any suitable combination thereof. In particular embodiments, social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 660 to one or more client systems 630 or one or more third-party system 670 via network 610. The web server may include a mail server or other messaging functionality for receiving and routing messages between social-networking system 660 and one or more client systems 630. An API-request server may allow a third-party system 670 to access information from social-networking system 660 by calling one or more APIs. An action logger may be used to receive communications from a web server about a user's actions on or off social-networking system 660. In conjunction with the action log, a third-party-content-object log may be maintained of user exposures to third-party-content objects. A notification controller may provide information regarding content objects to a client system 630. Information may be pushed to a client system 630 as notifications, or information may be pulled from client system 630 responsive to a request received from client system 630. Authorization servers may be used to enforce one or more privacy settings of the users of social-networking system 660. A privacy setting of a user determines how particular information associated with a user can be shared. The authorization server may allow users to opt in to or opt out of having their actions logged by social-networking system 660 or shared with other systems (e.g., third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node #04 corresponding to a particular photo may have a privacy setting specifying that the photo may only be accessed by users tagged in the photo and their friends. In particular embodiments, privacy settings may allow users to opt in or opt out of having their actions logged by social-networking system 660 or shared with other systems (e.g., third-party system 670). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 670, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 662 may be authorization/privacy servers for enforcing privacy settings. In response to a request from a user (or other entity) for a particular object stored in a data store 664, social-networking system 660 may send a request to the data store 664 for the object. The request may identify the user associated with the request and may only be sent to the user (or a client system 630 of the user) if the authorization server determines that the user is authorized to access the object based on the privacy settings associated with the object. If the requesting user is not authorized to access the object, the authorization server may prevent the requested object from being retrieved from the data store 664, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 7:
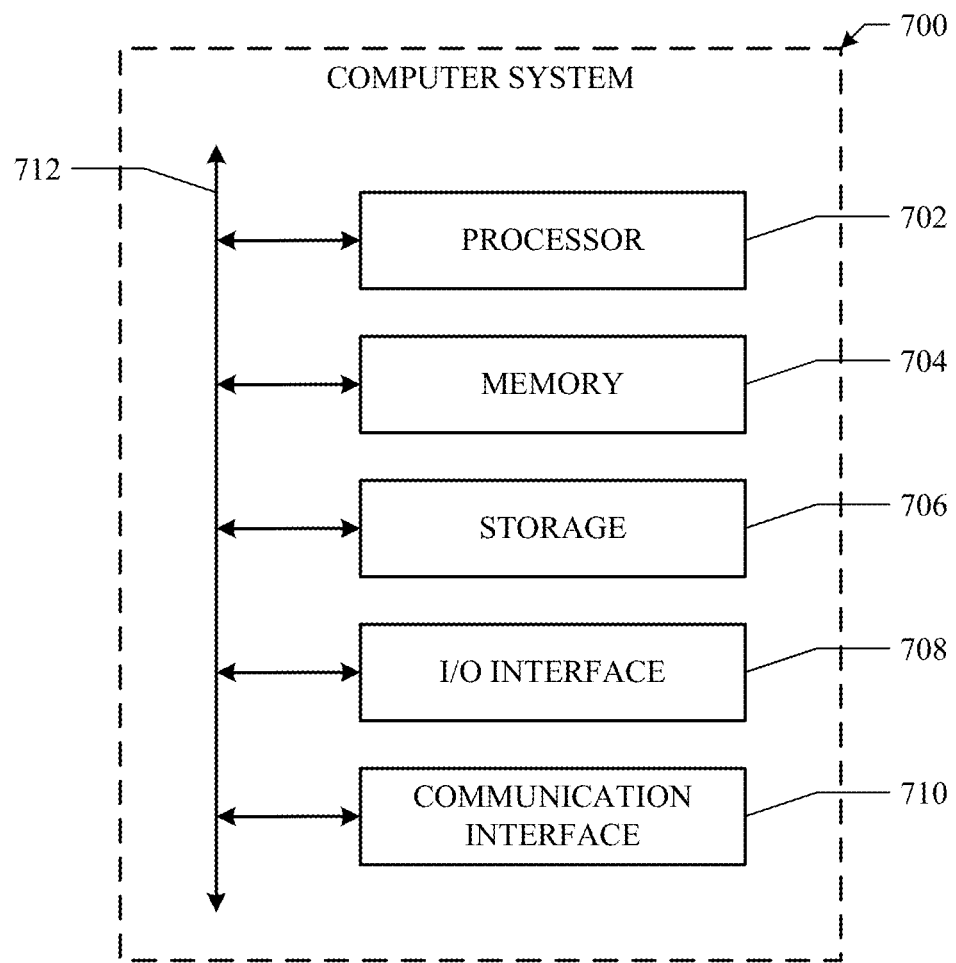
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
    determining one or more network performance metrics in a plurality of geographic areas connected by a communication network, wherein the network performance metrics are based on application data of a plurality of end users of the communication network in the plurality of geographic areas;
    receiving, from a network insights interface of a client system, a query for geographic areas of interest within the communication network, wherein the query specifies one or more network performance criteria based on one or more of the network performance metrics and one or more metric thresholds corresponding to those network performance metrics;
    identifying one or more geographic areas of interest, wherein each geographic area of interest contains communication infrastructure connected by the communication network, and wherein each geographic area of interest matches the one or more network performance criteria of the query;
    determining, for each geographic area of interest, one or more network performance features associated with the geographic area of interest based on the one or more network performance metrics derived from the application data of end users collected from the one or more geographic areas of interest;

generating one or more communication network optimization recommendations for one or more of the geographic areas of interest, wherein the communication network optimization recommendations are customized for the geographic areas of interest based on the one or more network performance features associated with the respective geographic areas of interest; and sending, to the client system in response to the query, instructions for presenting one or more of the communication network optimization recommendations in the network insights interface.

2. The method of claim 1, wherein each of the optimization recommendations comprises one or more recommended optimization actions, and wherein the recommended optimization actions are customized for the respective geographic areas of interest based on one or more of the performance features associated with the geographic areas of interest.

3. The method of claim 2, further comprising:
determining changes of one or more of the network performance metrics caused by one or more completed optimization actions based on historical data; and
determining whether the one or more completed optimization actions are effective in improving network performance in the one or more geographic areas of interest based on the changes of the one or more of the network performance metrics.

4. The method of claim 3, wherein the one or more performance features associated with the one or more geographic areas of interest comprise the one or more completed optimization actions that are proved to be effective in improving networking performance in the one or more geographic areas, and wherein the optimization recommendations are based on the one or more completed optimization actions.

5. The method of claim 2, further comprising:
predicting, using a machine learning model, changes of one more of the network performance metrics generated by the recommended optimization actions of the one or more optimization recommendations.

6. The method of claim 5, wherein the one or more performance features associated with one or more geographic areas of interest comprise the predicted changes in the one or more of the network performance metrics, and wherein the one or more optimization recommendations are based on the predicted changes in the one or more of the network performance metrics.

7. The method of claim 2, further comprising:
determining, using a cost-revenue model, one or more cost-revenue metrics associated with the one or more recommended optimization actions and the one or more geographic areas, wherein the one or more optimization recommendations are generated based on the one or more cost-revenue metrics.

8. The method of claim 2, wherein the one or more geographic areas of interest are identified based on a determination that a network capacity metric is above a network capacity threshold and a network demand metric is below a network demand threshold, and wherein the recommended optimization actions comprising one or more of:
reducing a cost to consumers to increase a customer volume;
generating segmented service plans to acquire more customers, wherein the segmented service plans are based on segmented regions, segmented prices, or segmented customer groups;
generating promotion content to promote one or more service plans;
running one or more promoting campaigns to acquire more customers; or
increasing retail site presences to acquire more customers.

9. The method of claim 2, wherein the one or more geographic areas of interest are identified based on a determination that a network capacity metric is below a network capacity threshold and a network demand metric is above a demand threshold, and wherein the recommended optimization actions comprising one or more of:
generating low-pricing service plans for non-busy hours for shifting network traffic from busy hours to the non-busy hours;
running one or more promoting campaigns for promoting one or more service plans for data offloading;
upgrading network for enhancing network capacity; or
improving network speeds in one or more areas with congestion alerts.

10. The method of claim 2, wherein the one or more geographic areas of interest are identified based on a determination that a network capacity metric is above a network capacity threshold and a network demand metric is above a demand threshold, and wherein the recommended optimization actions comprising one or more of:
generating service plans for increasing an average revenue per user;
generating service plans for reducing user churn rates;
generating up-sell service plans;
generating cross-sell service plans;
generating segmented campaigns for improving network efficacy;
generating granular level optimization recommendations;
generating optimization recommendations based on competitor status; or
running one or more promoting campaigns for promoting one or more service plans.

11. The method of claim 2, further comprising:
determining a priority score for each recommended optimization action, wherein the priority score is determined based on one or more of the network performance metrics.

12. The method of claim 1, wherein the application data of end users are collected for a large-scale geographic area, wherein the large-scale geographic area comprises a plurality of granular-level geographic areas, and wherein the one or more optimization recommendations are determined for the large-scale geographic area based on granular-level network performance features associated with respective granular-level geographic areas.

13. The method of claim 1, wherein the application data are collected from a plurality of communication networks, wherein the plurality of communication networks comprises at least one competitor's communication network, and wherein the optimization recommendations are based on network performance data and one or more optimization actions taken on the at least one competitor's communication network.

14. The method of claim 1, wherein the one or more performance features associated with the one or more geographic areas of interest comprise one or more customer features, and wherein the optimization recommendations are customized based on the one or more customer features.

15. The method of claim 1, wherein the one or more network performance metrics are determined by a network insight system, further comprising:
- detecting, using a network congestion system, one or more network congestions in the one or more geographic areas;
- determining, using a pricing system, a plurality of pricing rules for one or more services provided by the communication network; and
- generating, using a content generating system, a plurality of content elements based on the plurality of pricing rules for the one or more services, wherein the plurality content elements are associated with one or more groups of end users in the one or more geographic areas, and wherein the one or more optimization recommendations are based on the detected network congestions, the plurality of pricing rules, and the plurality of content elements.

16. The method of claim 1, further comprising:
- optimizing the communication network in the one or more geographic areas of interest based on the one or more optimization recommendations customized for the one or more geographic areas on interest.

17. The method of claim 1, wherein the one or more network performance metrics comprise one or more of:
- a network capacity metric;
- a network demand metric;
- a network speed;
- a network latency;
- a congestion metric;
- a congestion alert;
- an amount of content being requested by users;
- a peak traffic amount;
- peak traffic hours;
- busy hours;
- non-busy hours;
- a network throughput;
- a change of a network throughput;
- a network throughput quality metric;
- a network coverage metric;
- a population density;
- a network engagement time;
- a type of engagement network content;
- a market share;
- a churn rate;
- a connected population;
- a population that has an affordability metric above a threshold;
- a network capacity utilization efficiency;
- an overall revenue;
- a change in the overall revenue;
- a number of current customers;
- a data usage metric;
- a number of new customers;
- a predicted number of new customers;
- a number of customers switched from competitor;
- a predicted number of customers switched from competitor;
- an acquisition rate;
- a predicted acquisition rate;
- an acquisition cost per customer;
- a predicted acquisition cost per customer;
- a network revenue increase;
- a predicted network revenue increase;
- a completed optimization action;
- an impact metric of an optimization action in a geographic area;
- a predicted impact metric of an optimization action;
- a network performance metric of a competitor network;
- an optimization action taken by a competitor network;
- a network type;
- a network technology status;
- an area type;
- a geographic type;
- an area size;
- a budget for improving network;
- a data plan price;
- a pricing strategy;
- a cost to reach consumers;
- a cost for an optimization action;
- a cost for network operations; or
- a cost for retail operations.

18. The method of claim 1, wherein the one or more optimization recommendations are generated by a machine-learning model trained with pre-labelled data or historical data.

19. One or more computer-readable non-transitory storage media embodying software that is operable when executed to:
- determine one or more network performance metrics in a plurality of geographic areas connected by a communication network, wherein the network performance metrics are based on application data of a plurality of end users of the communication network in the plurality of geographic areas;
- receive, from a network insights interface of a client system, a query for geographic areas of interest within the communication network, wherein the query specifies one or more network performance criteria based on one or more of the network performance metrics and one or more metric thresholds corresponding to those network performance metrics;
- identify one or more geographic areas of interest, wherein each geographic area of interest contains communication infrastructure connected by the communication network, and wherein each geographic area of interest matches the one or more network performance criteria of the query;
- determine, for each geographic area of interest, one or more network performance features associated with the geographic area of interest based on the one or more network performance metrics derived from the application data of end users collected from the one or more geographic areas of interest;
- generate one or more communication network optimization recommendations for one or more of the geographic areas of interest, wherein the communication network optimization recommendations are customized for the geographic areas of interest based on the one or more network performance features associated with the respective geographic areas of interest; and
- send, to the client system in response to the query, instructions for presenting one or more of the communication network optimization recommendations in the network insights interface.

20. A system comprising: one or more non-transitory computer-readable storage media embodying instructions; and one or more processors coupled to the storage media and operable to execute the instructions to:
- determine one or more network performance metrics in a plurality of geographic areas connected by a communication network, wherein the network performance metrics are based on application data of a plurality of end users of the communication network in the plurality of geographic areas;

receive, from a network insights interface of a client system, a query for geographic areas of interest within the communication network, wherein the query specifies one or more network performance criteria based on one or more of the network performance metrics and one or more metric thresholds corresponding to those network performance metrics;

identify one or more geographic areas of interest, wherein each geographic area of interest contains communication infrastructure connected by the communication network, and wherein each geographic area of interest matches the one or more network performance criteria of the query;

determine, for each geographic area of interest, one or more network performance features associated with the geographic area of interest based on the one or more network performance metrics derived from the application data of end users collected from the one or more geographic areas of interest;

generate one or more communication network optimization recommendations for one or more of the geographic areas of interest, wherein the communication network optimization recommendations are customized for the geographic areas of interest based on the one or more network performance features associated with the respective geographic areas of interest; and send, to the client system in response to the query, instructions for presenting one or more of the communication network optimization recommendations in the network insights interface.

* * * * *